US006288362B1

(12) United States Patent
Thomas et al.

(10) Patent No.: US 6,288,362 B1
(45) Date of Patent: Sep. 11, 2001

(54) METHOD AND APPARATUS FOR TREATING SURFACES AND ABLATING SURFACE MATERIAL

(76) Inventors: James W. Thomas, 728 Loyola Dr., Los Altos, CA (US) 94024; Roland O'Banion, deceased, late of Fremont, CA (US), by Laura M. O'Banion, legal representative; Laura M. O'Banion, 4930 Fern Ter., Fremont, CA (US) 94538

( * ) Notice: Subject to any disclaimer, the term of this patent is extended or adjusted under 35 U.S.C. 154(b) by 0 days.

(21) Appl. No.: 09/066,039

(22) Filed: Apr. 24, 1998

(51) Int. Cl.[7] ............................ B23K 26/00; B23K 26/14; B23K 26/16
(52) U.S. Cl. ............................ 219/121.84; 15/339; 134/1
(58) Field of Search ............................ 219/121.6, 121.84; 15/339

(56) References Cited

U.S. PATENT DOCUMENTS

| | | | |
|---|---|---|---|
| 5,281,798 | * | 1/1994 | Hamm et al. ............... 219/121.62 X |
| 5,328,517 | * | 7/1994 | Cates et al. ............... 134/1 X |
| 5,662,762 | * | 9/1997 | Ranalli ............... 219/121.69 X |
| 5,780,806 | * | 7/1998 | Ferguson et al. ............... 219/121.68 |

OTHER PUBLICATIONS

"Laser ablation of Contaminants From Concrete and Metal Surfaces", 3pp., Internet site http://www.em.doe.gov/raindd/dd23.html, posted Oct. 12, 1995.*
Mar. 1997 "Photonic Cleaning Process Moves to Heavy Industry", *Photonics Spectra*, p. 22.
Aug. 8, 1994 "Radiant Energy Based Cleaning and Coating Removal Technology Comparison", INTA Corp.
Jun. 9–11, 1992 Philip A. Barone, "Automated Laser Paint Stripping (ALPS)," Society of Manufacturing Engineers.
1997 "The Company—The Technology," General Lasertronics Corporation.
Apr. 1997 "Lasertronics—Corporate Overview," General Lasertronics Corporation.
Apr. 1997 "Lasertronics—Aircraft Paint Removal," General Lasertronics Corporation.
Apr. 1997 "Lasertronics—Radiation/Medical," General Lasertronics Corporation.
Apr. 1997 "Lasertronics—Graffiti Abatement," General Lasertronics Corporation.

(List continued on next page.)

*Primary Examiner*—Chris K. Moore

(57) ABSTRACT

A system for treating surface material overlying a substrate, and more particularly, to a system for ablating contaminates and other unwanted material from a worksite using a pulsed laser beam. The system includes three main sub-systems: a back end (30), a work head (100), and an umbilical tube (88) to protect conduits communicating between the back end (30) and the work head (100). The back end (30) includes heavy and bulky equipment such as a laser (32), chiller, pressurized air source (70), suction system, waste containment system, and electric power source (78). A conveyance such as a trailer may enclose the back end (30) to make it transportable. The work head (100) includes lightweight equipment such as scanning mirrors, optics, and camera (130). During operation, the work head (100) is pressed against the surface material and the laser (32) activated. Then scanning mirrors within the work head (100) arrange pulses from the laser beam according to a selected raster and dither pattern and direct them to the surface material. Ablated detritus may be suctioned through a conduit through the work head (100) and thence to the waste containment system in the back end (30). Electric power, laser energy, control and monitor signals, air, and suction are transported between the back end (30) and the work head (100) through the conduits encased within the umbilical tube (88).

2 Claims, 23 Drawing Sheets

OTHER PUBLICATIONS

Apr. 1997 "Lasertronics—Lead–based Paint Removal," General Lasertronics Corporation.

1978 Walter G. Driscoll and William Vaughan, eds, Handbook of Optics, pp. 13–6—13–10.

Jul. 20, 1995 Katherine Liu and Elsa Garmire, "Paint Removal Using Lasers," Applied Optics vol. 34, No. 21, pp. 4409–4415.

Nov. 1994 Paul Lovoi, "Laser Paint Stripping Offers Control and Flexibility," Laser Focus World, pp. 75–80.

Aug. 1991 R. Bonkowski and V.E. Merchant, "CW Laser Paint Stripping."

Undated Paul Lovoi, "Laser/Robot Paint Stripping: Laser Ablation Coating Removal," International Technical Associates.

* cited by examiner

Fig. 11
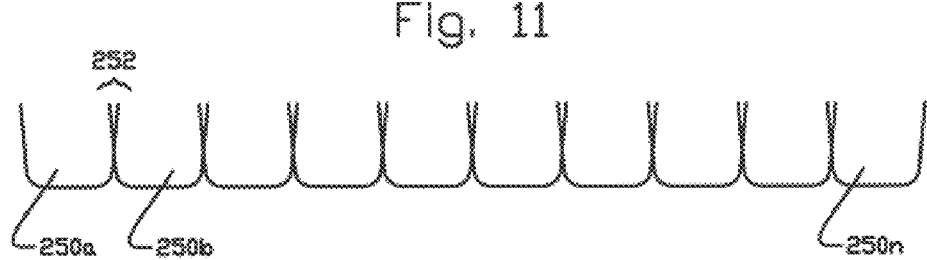
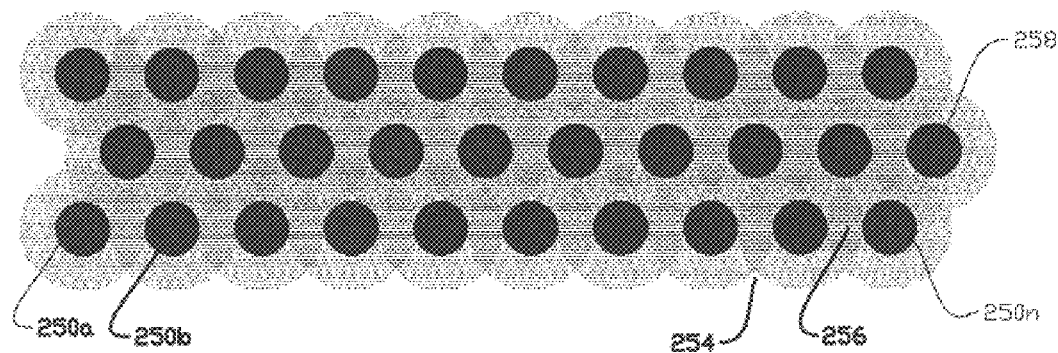
Fig. 12

METHOD AND APPARATUS FOR TREATING SURFACES AND ABLATING SURFACE MATERIAL

FIELD OF THE INVENTION

The present invention relates to a system for treating surface material overlying a substrate, and more particularly, to a system for ablating contaminates and other unwanted material from a worksite using a laser.

BACKGROUND OF THE INVENTION

Using industrial lasers to treat surface material is known in the prior art. These treatments include glazing, sealing, marking, and drilling. Of particular relevance to this invention are a number of proposals to remove, by laser ablation, material from an underlying substrate. For example, United States patents have issued for removing paint, grease, dirt, rubber, ceramic, mineral scale, dielectric, and electrical conductor surface material by means of laser ablation. See:

U.S. Pat. No. Re. 33,777 issued to Woodroffe [paint, grease, ceramics]

U.S. Pat. No. 5,592,879 issued to Waizmann [dirt]

U.S. Pat. No. 5,637,245 issued to Shelton et al. [rubber]

U.S. Pat. No. 5,113,802 issued to Le Blanc [mineral scale]

U.S. Pat. No. 4,671,848 issued to Miller et al. [dielectric coating]

U.S. Pat. No. 3,941,973 issued to Luck et al. [electric conductor]

Previously, removing surface material frequently required physical or chemical methods. These methods included physical abrasion, blasting surfaces with media such as sand, and using chemical solvents. Not only did these methods often damage the substrate, but the removal of surface material created a new problem; disposing of a waste stream bloated with contaminated cleaning material.

The potential commercial advantages of using laser ablation are significant. Not only is the waste stream to be treated and disposed of much reduced but there is potentially less recontamination of the surface itself. For example, chemicals used in the prior art to strip surface contaminates themselves could recontaminate the surface. Another advantage is that a beam of electromagnetic radiation may be fine-tuned to ablate surface material ranging from microfine contaminants to visible discrete particles. And, of course, the beam can navigate exceedingly narrow passageways as well as ablate material from microscopic pores.

However the problems inherent in creating a workable system have limited laser ablation technology to a few niche applications. These problems include high cost, non-transportable equipment, contamination of optics by ablated material, laser damage to internal optics, deficient feedback and control, inadequate safety systems, lack of ablation waste collection and containment, the need to isolate sensitive equipment from soily worksites, interference of ablation detritus with the beam at the work surface, and the difficulty of delivering a quality beam of electromagnetic radiation over distance.

A known way to deliver electromagnetic radiation is via fiber optics. However, a persistent problem has been the difficulty of inserting a high power laser beam into a fiber optic strand. Particularly, the entrance face of the strand is a barrier. A high power laser beam impinging upon the entrance face is analogous to a tsunami striking a sea wall. It turns out that in a fiber of a given diameter, the amount of energy that the fiber can transmit is about ten times the amount that can be inserted at the entrance face without damage to the face.

SUMMARY OF THE INVENTION

The present invention has as its object to provide a method and apparatus by which surface material may be ablated effectively and safely with minimal collateral damage to the worksite. The primary components of the apparatus are a back end system (kept distant from the worksite), a work head, and an umbilical tube connecting the back end and the work head.

A design philosophy of this invention is to isolate bulky equipment in the back end, which may be housed inside a small truck or trailer, to make the work head lightweight and durable enough to be handheld or incorporated in a robotic arm, and to link the back end and work head with an umbilical tube. Within the umbilical tube are transportation and communications conduits between back end services and work head functions.

One subsystem in the back end generates a pulsed beam of electromagnetic radiation, preferably involving a $CO_2$ or a Q-switched Nd:YAG laser emitting coherent infrared light. The beam is collimated and focused onto a collector face of a fiber optic strand. The fiber is tapered from the collector face to the strand body. Then the pulsed beam travels along the strand body, enclosed in the umbilical tube, until it reaches the work head and emerges from an exit face. After lenses within the work head recollimate and refocus the beam, sets of scanning mirrors arrange the series of pulses according to a selected raster and dither pattern, and direct them to a work surface.

In addition to incorporating the fiber exit face, lenses, and scanning mirrors, the work head includes several other component systems. On its exterior, the work head has an operator trigger, surface interlock system, several operator switches, LED indicator lights, and monitor. An operator activates the ablation process by depressing the trigger. The switches permit the operator to select from several options relating to ablation speed and quality. The monitor permits the operator to view how ablation is progressing. The surface interlock system, at the point of contact between the work head and the worksite, serves as a safety measure; if the work head is not pressed against the worksite with sufficient force, the interlock deactivates the laser.

Interior to the work head are two sections separated by a pane of glass. One section, a nozzle in contact with the surface material during the ablation process, includes the surface interlock system, an intake hose to evacuate ablated detritus, and flexible material on the perimeter of the nozzle to seal and prevent gaps between the nozzle and the worksite during laser operation. Optionally, another system within the nozzle forces a substantially inert gas (an "air knife") across the surface being ablated to sweep detritus away from the beam and into the evacuation system.

The second work head section, on the opposite side of the glass pane, contains the scanning mirrors which create the rastering and dithering pattern from the pulsed beam. This beam pattern is directed at the glass pane, coated to reduce reflection and maximize transmission of laser radiation, and thence to the work surface. A monitoring system, including a camera and a light source, sends feedback information on ablation progress to the monitor for viewing by the operator. In addition to protection provided by the glass pane, ablated material and debris are kept out of the second section by a system which maintains greater internal air pressure than ambient air pressure.

Other subsystems in the back end include a power supply and distribution system (to provide electricity to subsystems in both the back end and the work head), one or more systems to provide pressurized gas to the work head, a system to circulate coolant through the subsystems, a blower to provide suction needed for the nozzle evacuation system, and a system to collect, filter, scrub fumes from, absorb, and otherwise contain the waste stream that the evacuation system delivers to the back end.

It is an object of the present invention to provide a method and apparatus of treating a surface with electromagnetic radiation while minimizing degradation and contamination of underlying substrate.

It is a further object of the invention to isolate bulky equipment from soily environments while making the equipment transportable to stationary worksites.

It is yet a further object of the invention to protect work head optics from worksite ablation detritus.

It is yet a further object of the invention to provide an efficient collection method of ablation detritus and to reduce the volume of a worksite waste stream.

It is yet a further object of the invention to transport a quality electromagnetic radiation beam over distance with delivery of an effective beam ablation pattern to a work surface.

Other objects and advantages of the invention will be apparent from the following description, the accompanying drawings and the appended claims.

BRIEF DESCRIPTION OF DRAWINGS

In the drawings, closely related figures have the same number but different alphabetic suffixes.

FIG. 11 is a one-dimensional side view of the intensity profiles of the output beam of FIG. 7 repeated in a spaced, pulsed sequence.

FIG. 12 is a two dimensional plan view of a scan pattern of the sequence of FIG. 11 impinging upon a work surface in accordance with the invention.

DETAILED DESCRIPTION OF A PREFERRED EMBODIMENT

The following disclosure is illustrative only and not limiting. Various and numerous alternate embodiments of the present invention are made obvious to one skilled in the art in view of this disclosure.

Figure 1A:
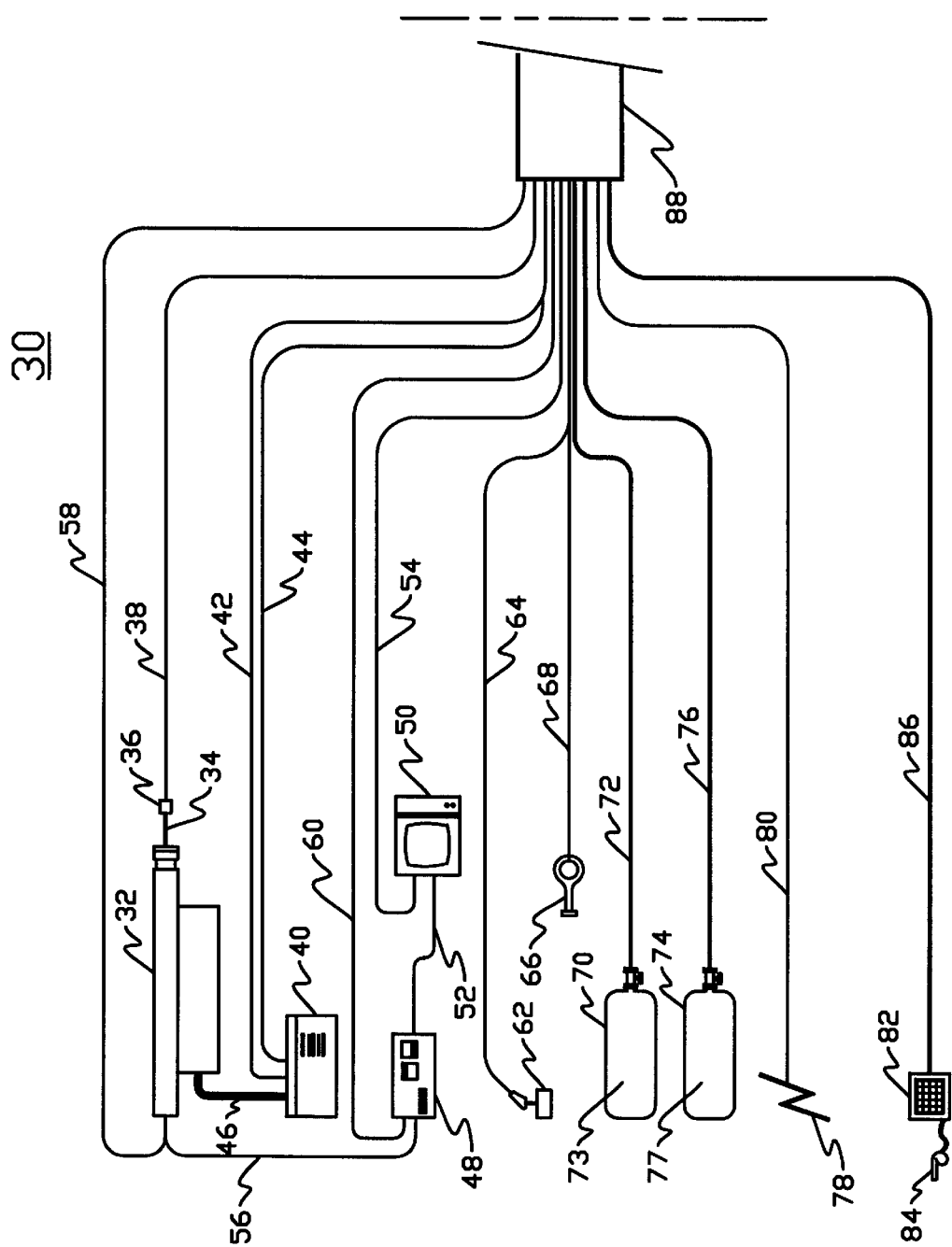
FIG. 1a and FIG. 1b, taken together, is a schematic diagram of a laser surface treatment method and apparatus according to the invention.
Figure 1B:
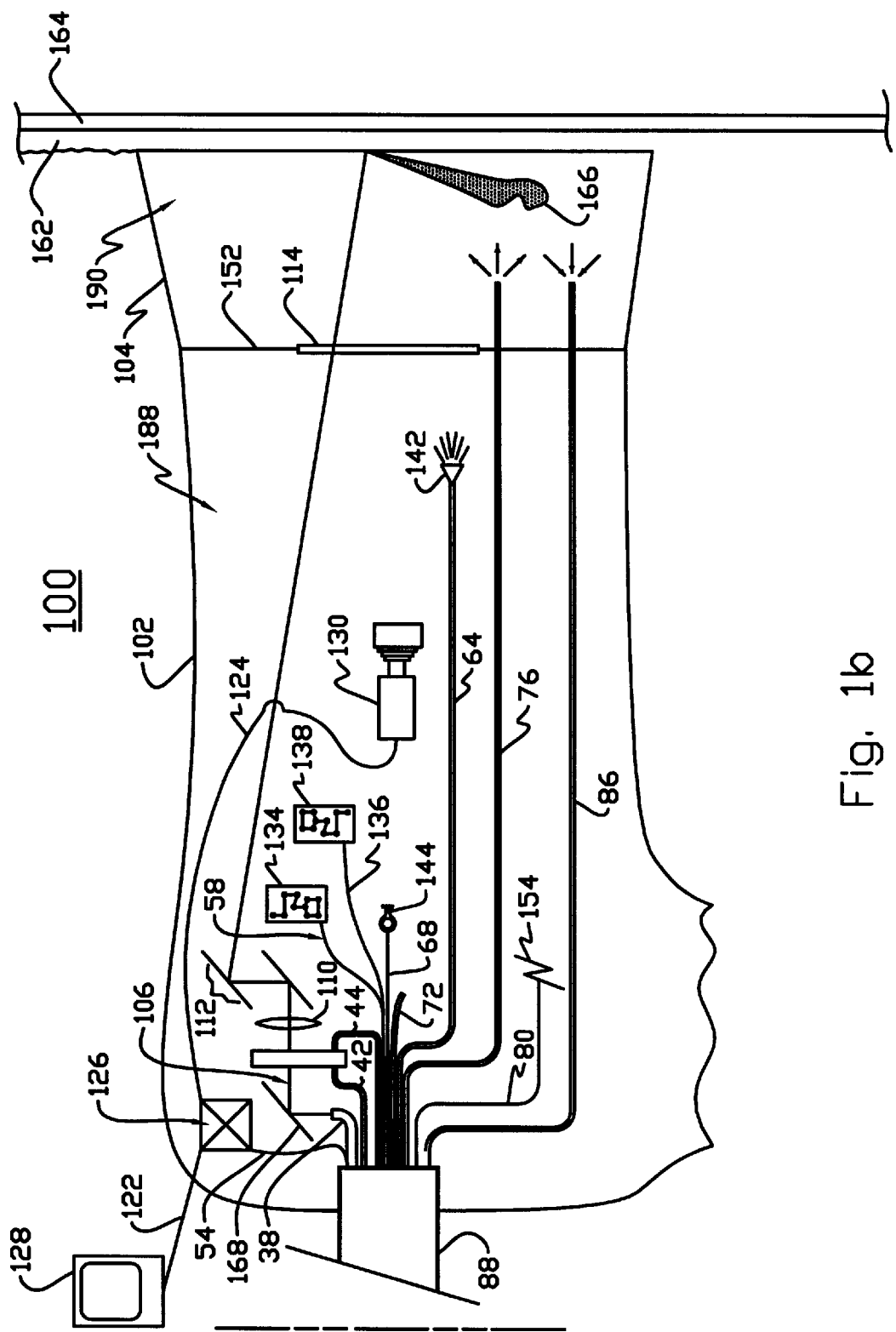

Referring now to FIG. 1a and FIG. 1b, a preferred embodiment of the present invention, a surface treatment and laser ablation system LAS, is shown to include a back end system 30, a work head 100 and an umbilical tube 88 The back end system 30 may include bulky and heavy components of the LAS. Other components such as those sensitive to vibration, dust, and radiation may also be included in back end system 30. While the specific components within the back end system 30 may vary according to specific implementations of the invention, an illustrative embodiment may contain a system controller 48, a laser 32, an electrical power source 78, a pressurized air source 70, an inert gas source 74, a blower 84, an exhaust filter 82, a first anchor 66, a light source 62, a video monitor 50 and a chiller 40.

Umbilical tube 88 provides a protected delivery channel for various conduits including a strain relief cable 68, a set of material transport tubes 42, 44, 72, 76 and 86, an illumination fiber optic 64, a laser energy fiber optic 38, and a set of electrical signal, status, control and power cables 58, 60, 54 and 80 extending between the back end system 30 and the work head 100. The strain relief cable 68 is anchored to the back end system 30 at a first anchor 66 and to the work head 100 at a second anchor 144. The strain relief cable 68 is made of a length of strong material such as a metal or a plastic or other suitable material known in the art, and is preferably shorter than the all other tubes, transport means, and cables 42, 44, 72, 76, 86, 64, 38, 58, 60, 54 and 80 contained within the umbilical tube 88. The shorter length of the strain relief cable 68 and the anchoring of the strain relief cable 68 to the back end system 30 and the work head 100 serve to protect the umbilical tube conduits 42, 44, 72, 76, 86, 64, 38, 58, 60, 54 and 80 from damage due to applied tension or stretching.

The system controller 48 is electrically connected to the laser 32 by the control signal cable 56, to a video monitor 50 via the cable 52 and to a work head controller 138 via the signal a primary bi-directional control, status, data and control signal cable 60. The term signal cable is defined in this document to identify any suitable means known in the art that transmits one or more types of electrical signal or energy such as a power signal, a data signal, a video data, a status signal, a control signal or any other suitable unidirectional or bi-directional electrical signal type known in the art. The control signal cable 60 enables the system controller to monitor the state of the work head 100 and to control the direction of output beam 106 via control of a scanner mirror system 112 by the work head controller 138 The signal cable 56 allows the system controller 48 check the status of the laser 32 and to direct the laser 32 to generate an input beam 34.

The control signal cable 58 electrically connects the laser 32 to the safety circuit 134, and allows the safety circuit 134 to inhibit the laser 32 from generating input beam 34 where the work head is not in a safe operational state for an application of the input beam 34 against the work surface contaminate 162. The safety circuit 134 is electrically connected to a plurality of proximity sensors (also called safety interlock points) 300, shown in FIG. 18. The plurality of safety interlock points inform the safety circuit 134 when the work head 100 is properly positioned against the work surface contaminate 162 so that the output beam 106 will not escape outside of a working volume 190 bounded by the nozzle 104 perimeter, the nozzle 104 itself, and the work surface 164.

When the safety circuit 134 indicates the existence of a safe operational state, the laser 32 is directed to generate the input beam 34 which is directed into a lens assembly 36. The lens assembly 36 collimates, focuses, and delivers the input beam 34 into laser energy fiber optic 38, which in turn passes from the back end 30 through the umbilical tube 88 to work head 100. Upon reaching work head 100, input beam 34 exits laser energy fiber optic 38 in the direction of a mirror 168.

The chiller 40 refrigerates a coolant which circulates to and from the laser 32 via a back end coolant transport tube 46. This provision of the coolant to the laser 32 maintains the laser 32 in a functional state by absorbing excess heat energy created by the laser 32 during the generation of the input beam 34. Coolant also circulates between the work head 100 and the chiller 40 via a first work head coolant transport tube 42 and back from the work head 100 and to the chiller 40 via a second work head coolant tube 44 The first and second work head coolant tubes 42 and 44 pass through the umbilical tube 88 and circulate coolant about a focal objective 110 of the work head 100, and, optionally, other areas of the work head. This circulation of coolant absorbs heat energy transmitted from the input beam 34 and electrical power source 78 thus cooling the objective 110 and other heat sensitive portions of the work head 100.

The cable 54 electrically connects the operator video monitor 50 to the video controller 126. The video controller 126 is further connected to a camera 130 via a camera signal line 124 and via an operator video signal cable 122 to an operator monitor 128. The video controller 126 receives video data signals from the camera 130 and transmits the video information to the operator monitor 128 and or the video monitor 50. The cable 54 originates in the back end system 30, passes through the umbilical tube 88 and ends at the video controller 126 in the work head 100.

A light source 62 located in the back end system 30 emits visible light energy that is transmitted via an illumination fiber optic 64 through the umbilical tube 88 exiting within the work head 100 at an illumination point 142. The visible light energy then traverses window 114, illuminates the working volume 190, work surface contaminate 162, and any exposed work surface 164, and allows camera 130 to observe and pass along information on the progress of the treatment (which may include, but is not limited to, glazing, sealing, marking, and drilling work surface 164 as well as ablating work surface contaminate 162).

A volume of pressurized air 73 stored in or created by a pressurized air source 70 passes into the work head 100 via an air transport tube 72 passing through umbilical tube 88. The purpose of pressurized air 73 is described further below.

Optionally, an inert gas 77, stored in an inert gas source 74, passes through transport tube 76 to nozzle 104. Released into the working volume 190, inert gas 77 may operate as an air knife, sweeping detritus away from the path of output beam 106 and toward exhaust tube 86. Delivery of inert gas 77 reduces the degree of oxidation damage to the work surface 164 as it is exposed during treatment by flushing away oxygen from the working volume 190. A inert gas transport tube 76 originates at the inert gas source 74, passes through the umbilical tube 88, the work head 100 and into the working volume 190.

Electrical power is delivered to the work head 100 via the power cable 80 from electrical power source 78. The power cable 80 delivers power to the safety circuit 134, the work head controller 138, the camera 130, the scanner system 112, the video controller 126 and the operator monitor 128 The power cable 80 travels from the electrical power source 78, through the umbilical tube 88 and into the work head 100 to a power distribution system 154.

An exhaust tube 86 transports work surface contaminate 162 as it is ablated from the work surface 164 through the umbilical tube 88 and towards a filter 82 A blower 84 creates the low pressure condition in the exhaust tube 86 that suctions a plume of ablated contaminate 166 out of the working volume 190 and into the exhaust tube 86.

Work head 100 comprises a shell 102, a seal 152, a protective window 114 and a nozzle 104. The protective window 114 is made of a material or materials such as silicate glass or other suitable materials, including coated silicate glass or plastic composites, known in the art that allow the output beam 106 to pass through the window 114 without significant loss of laser energy.

The shell 102 in combination with the seal 152 and the window 114 seals instrument volume 188. The sealed instrument volume 188 protects the laser emission point of the output beam 106, the laser energy fiber optic 38, the work head control circuit 138, the scanner lens system 112, the objective and lens system 110, the mirror 168, the safety circuit 134, the video camera 130, the visible light emission point 142, the video controller 126 and other components of the work head 100 from contamination by detritus generated during the ablation process.

The action of the air transport tube 72 feeding the pressurized air 73 into the instrument volume 188 results in the maintenance of a higher pressure condition within the instrument volume 188 in comparison to the outside atmospheric pressure of the instrument volume 188. This creation of a state of positive pressure differential of the instrument volume 188 in contrast to the air pressure of the outside environment further protects the operation and condition of the components of the work head 100 from leaks in shell 102 which otherwise might allow contamination by the plume of ablated contaminate 166.

The work head 100 further partially contains the inert gas transport tube 76, the exhaust tube 86, safety interlock points 300, an operator monitor 128, the operator monitor video signal cable 122. The operator monitor 128 receives video data from the camera 130 via the camera video data cable 122 and alternately or simultaneously transmits the received video data to the back end monitor 50 via the cable 54.

The nozzle 104 is attached to the work head shell 102 and is made of metal, plastic or other suitable material known in the art. The set of safety interlock points 300 is located in the nozzle 104 and is used to determine if the nozzle is effecting a tight seal about the work surface contaminate 162 and work surface 164. This tight seal is desirable in order to insure that the output beam 34, when activated and directed at a target work surface contaminate 162 overlying the substrate work surface 164, will be safely contained within the working volume 190.

The inside surface of nozzle 104, in combination with the window 114, the seal 144, and the work surface contaminate 162, establishes and defines the working volume 190. The proximity sensors detect the establishment, or lack of establishment, of physical contact between an outer periphery of the nozzle 104 and the work surface contaminate 162. The proximity sensors, or safety interlock points 300, are electrically connected to the safety circuit 134, establishing uniform physical contact between the nozzle 104 and the work surface contaminate 162 along the total length of the perimeter of nozzle 104, when successfully achieved, is sensed and reported. A working ablation volume 190 is created when the work surface 164 is impenetrable by the output beam 106 and the sealed working volume 190 defines a zone wherein the output beam 106 can be safely employed without releasing of laser energy outside of the working volume 190 causing damage to an operator of the work head 100 system or to any other personnel or equipment in the vicinity.

The work head shell 102, the seal 144 and the nozzle 104 are constructed of metal, plastic or composite materials or other suitable material known in the art that inhibit a substantive transmission of the laser energy of the input beam 34 and output beam 106.

Figure 2A:
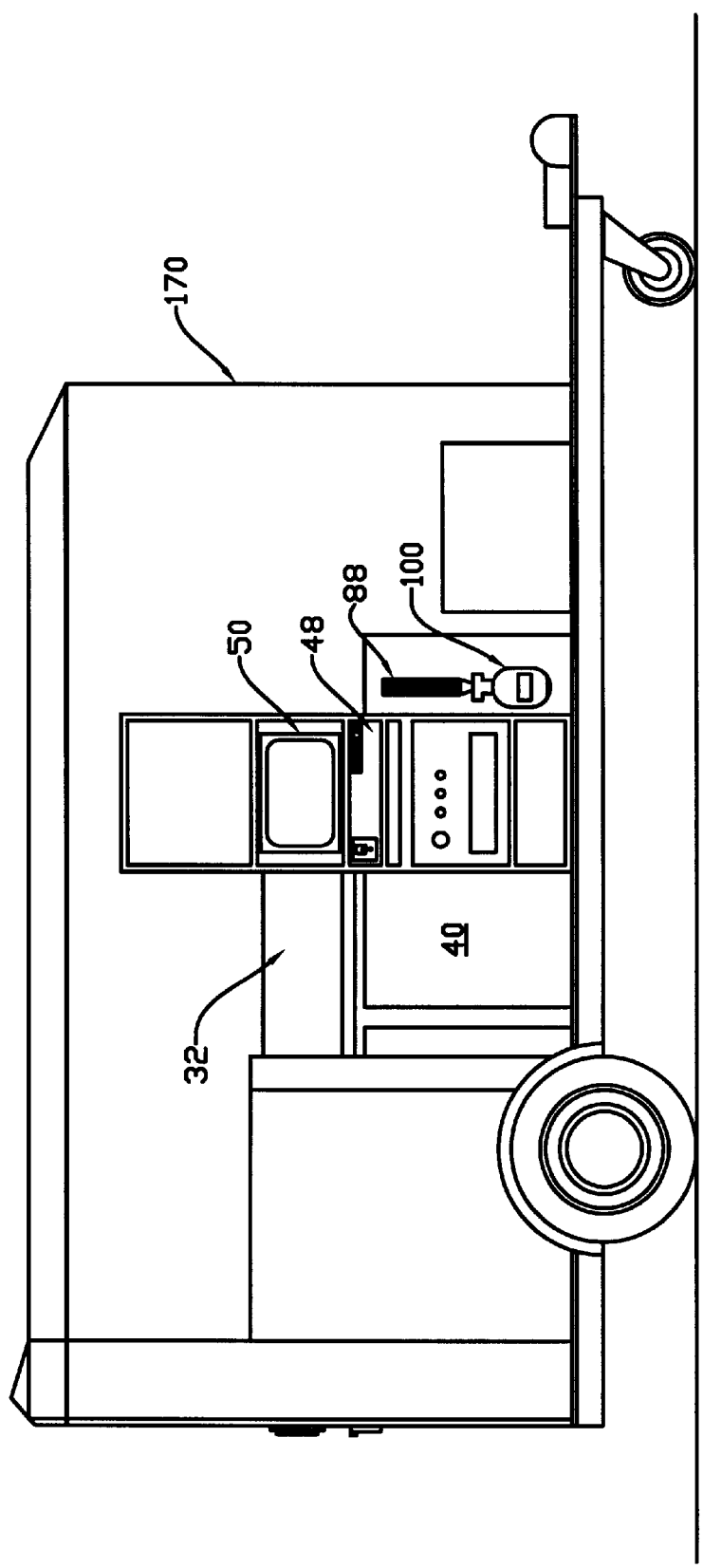
FIGS. 2a and 2b are starboard and port side views, respectively, of a trailer with sides removed showing how the invention may be stowed for transportation to a worksite.
Figure 2B:
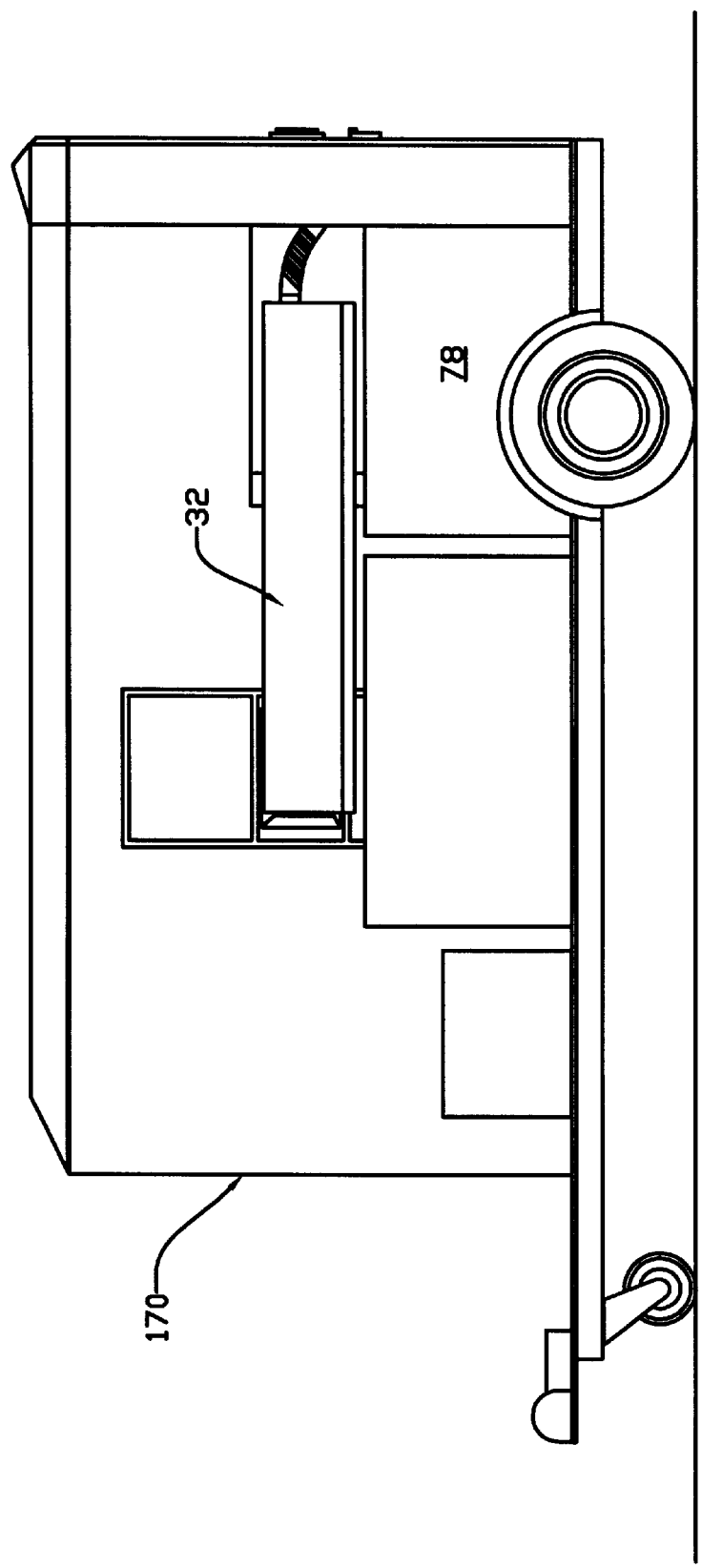
Figure 19:
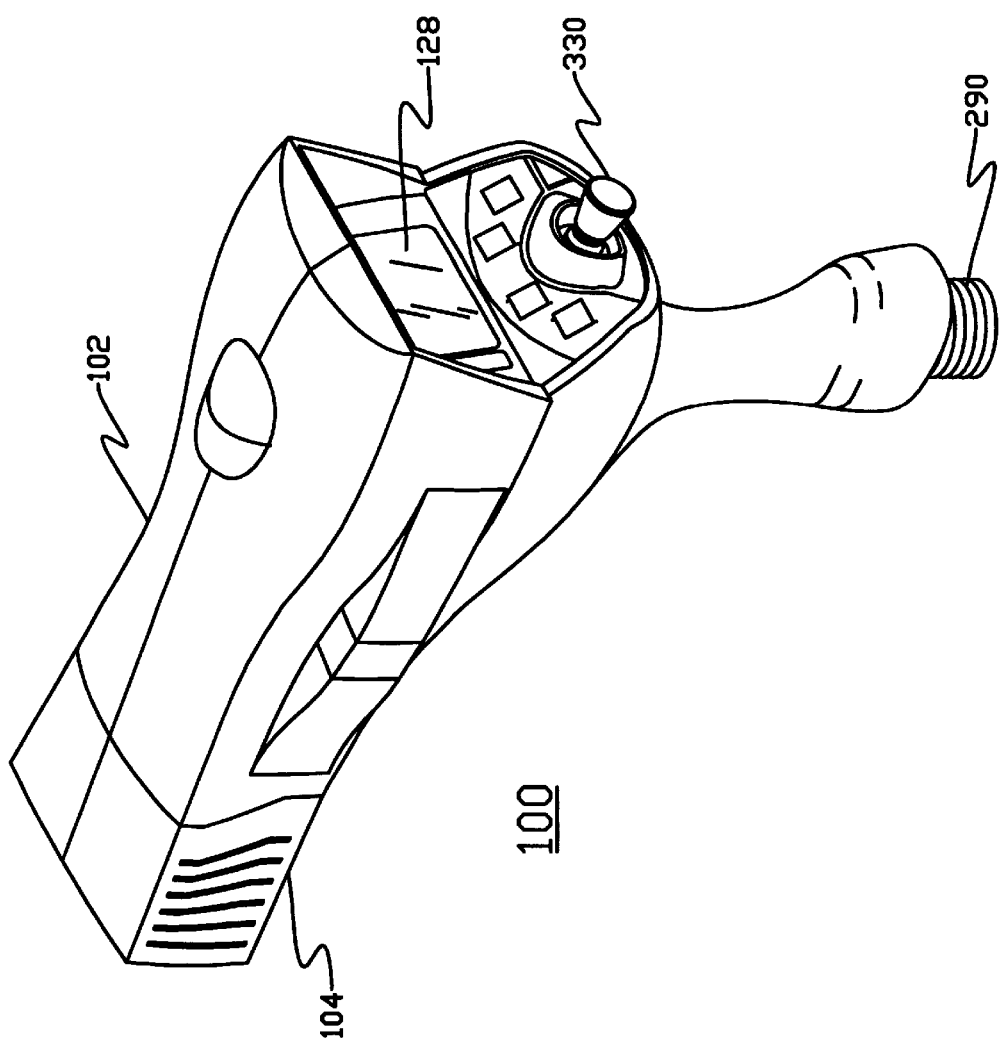
FIG. 19 is an isometric view of the exterior of the work head of FIG. 1b.

Referring now to FIG. 2a and FIG. 2b, a starboard side and a port side, respectively, of a trailer 170 housing the LAS of FIG. 1a and FIG. 1b for transport is presented. The trailer is one example of a means of transporting the back end. Numerous other conveyances (e.g. trucks, rail cars, air and water craft, etc.) are known in the art and are suitable for housing the LAS. Indeed, for some applications, the LAS may be mounted to a location and the work surface 164 transported to the LAS. The laser 32, the chiller 40, the system controller 48, the video monitor 50 and the electrical power source 78 are installed within the trailer 170. The umbilical tube 88, the work head 100 and the operator monitor 128 may be stowed at a travel position (as shown in FIG. 2a) within the trailer 170 or other conveyance. The umbilical tube 88 remains attached to both the back end system 30 and the work head shell 102. The umbilical tube 88 is stored for travel in an unextended and retracted position. The operator monitor 128 is located on the outside of the shell 102 of the work head 100 (FIG. 19).

Referring now generally to the FIG. 2a and FIG. 2b, the trailer 170 houses, supports and makes mobile the LAS. At a work site, the work head 100 may be retrieved from the traveling position and the umbilical tube extended so that the work head 100 may treat the work surface contaminate 162 at a distance sufficient to prevent soily detritus from contaminating back end 30.

The laser 32 is preferably an industrial laser capable of pulsed operation and is also preferably a $CO_2$ or a Q switched Nd:YAG laser. The preferred wavelength of electromagnetic radiation output from laser 32 depends on the material to be treated. For many applications, a laser outputting infrared radiation is preferred. Infrared radiation heats many types of work surface contamination until they boil off an underlying substrate. An ultraviolet laser beam can decontaminate a surface by breaking molecular bonds of unwanted surface material. In still other applications, visible light laser radiation is appropriate (e.g., black paint will absorb visible light radiation and boil off more readily than white paint). Lasers each emitting a different wavelength, more than one laser of the same wavelength, or various combinations of lasers of various wavelengths may be combined in a system either by interleaving pulses of radiation or by providing more than one laser beam fiber optic transport in the LAS. An example of a task in which combining lasers of different wavelengths is where it is desired to break molecular bonds of a contaminate and then boil it off a substrate.

Figure 3:
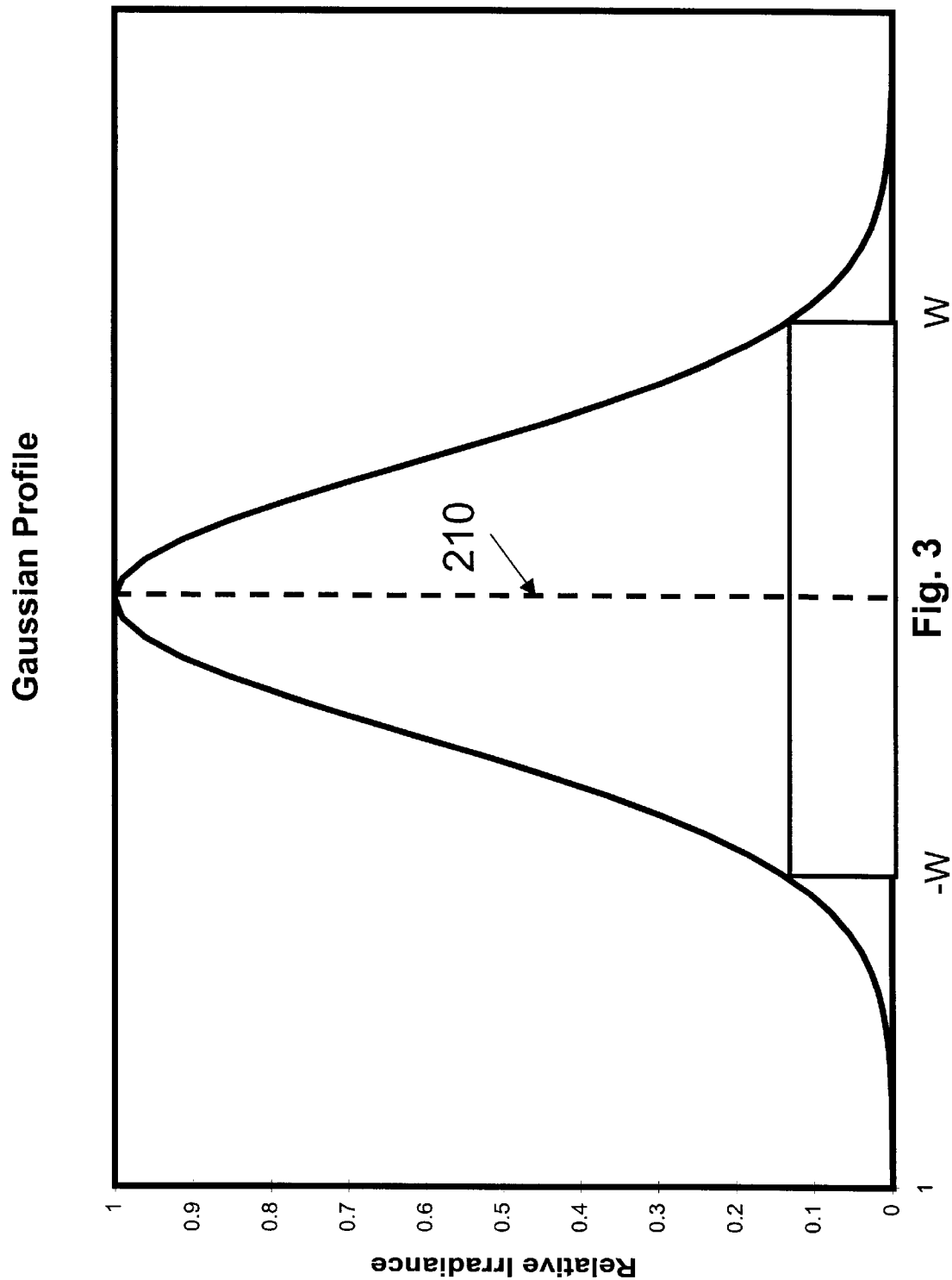
FIG. 3 is a $TEM_{00}$ Gaussian intensity profile for a quality beam of coherent electromagnetic radiation ("input beam") emitted from a low power laser.

The power output of laser 32 may be as low as five to ten watts for a low power system, useful for fine and detailed surface treatments and ablation, to as great as hundreds of kilowatts in a high power system. High power embodiments are useful for high speed treatment of large area surfaces. Preferably, the output of the laser 32, input beam 34, is a high quality (i.e., highly collimated, highly coherent, and diffraction limited) $TEM_{00}$ Gaussian profile beam (FIG. 3). The higher the quality of the input beam 34, the less complicated objectives 36 and 110 need to be.

For a laser system with a power rating more than a few tens of watts, $TEM_{00}$ output is generally expensive or impractical. So where a situation requires an embodiment of this invention incorporating such a higher power laser, the beam intensity profile will more likely resemble FIG. 4.

Figure 4:
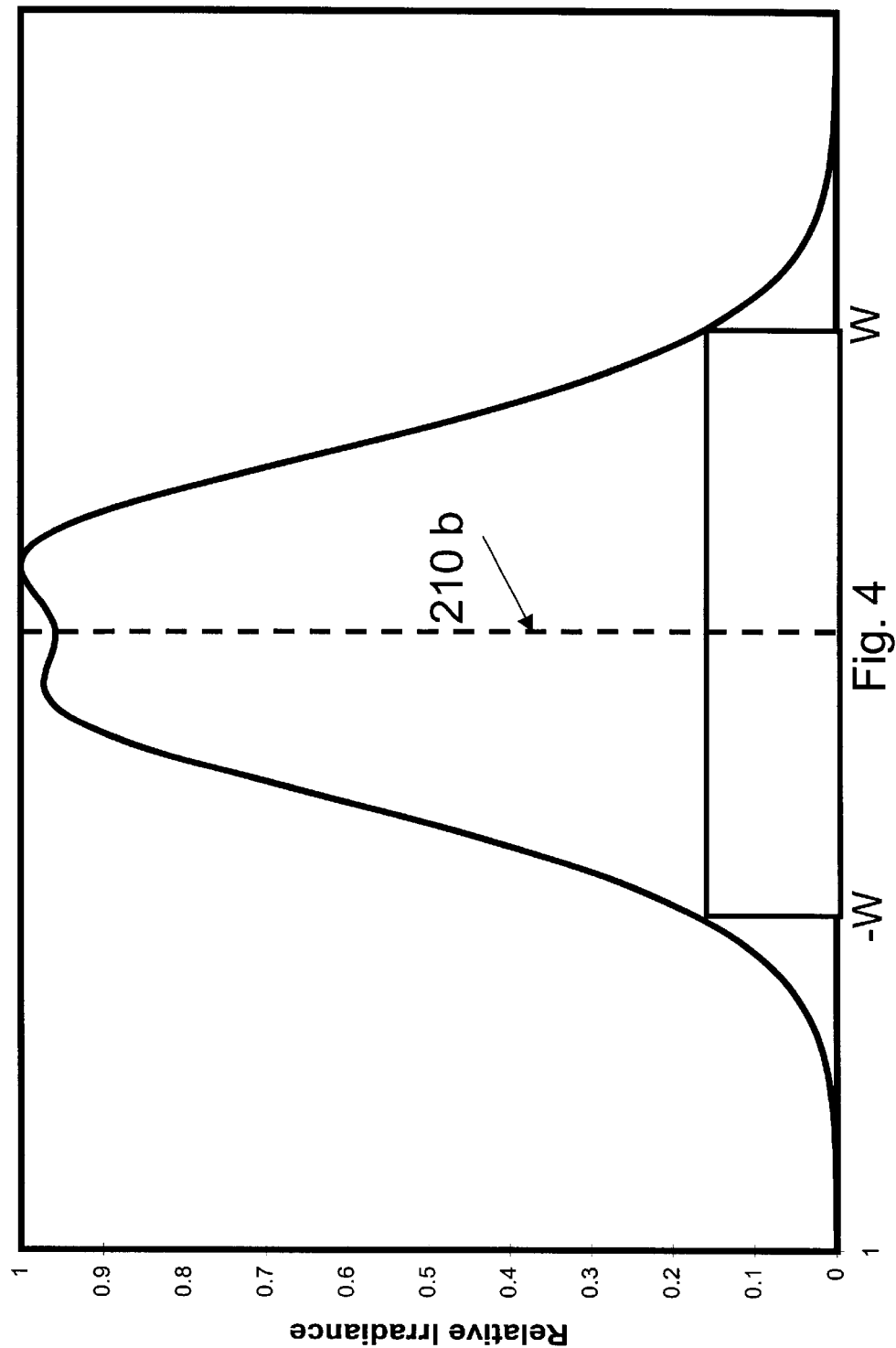
FIG. 4 is a typical intensity profile for a beam of coherent electromagnetic radiation ("input beam") emitted from a medium to high power laser.

The total area under the curve of FIG. 3 and FIG. 4 represent the total electromagnetic radiation energy output of a laser system. The goal of the LAS is to impinge as much of this energy "as is practical" upon a optic fiber face for transfer from the back end 30 through the umbilical tube 88 continuing through work head 100 systems and eventually to work surface contaminate 162. In the art, the phrase as much "as is practical" is generally taken to mean about 86.5 percent of the area under the curve. In FIG. 3 this area is noted as the area under the curve extending from –w to w; in FIG. 4 it is approximately from –w' to w'. Distances w, –w, w' and –w' are defined as their distances from center line 210a and center line 210b respectively.

Figure 5:
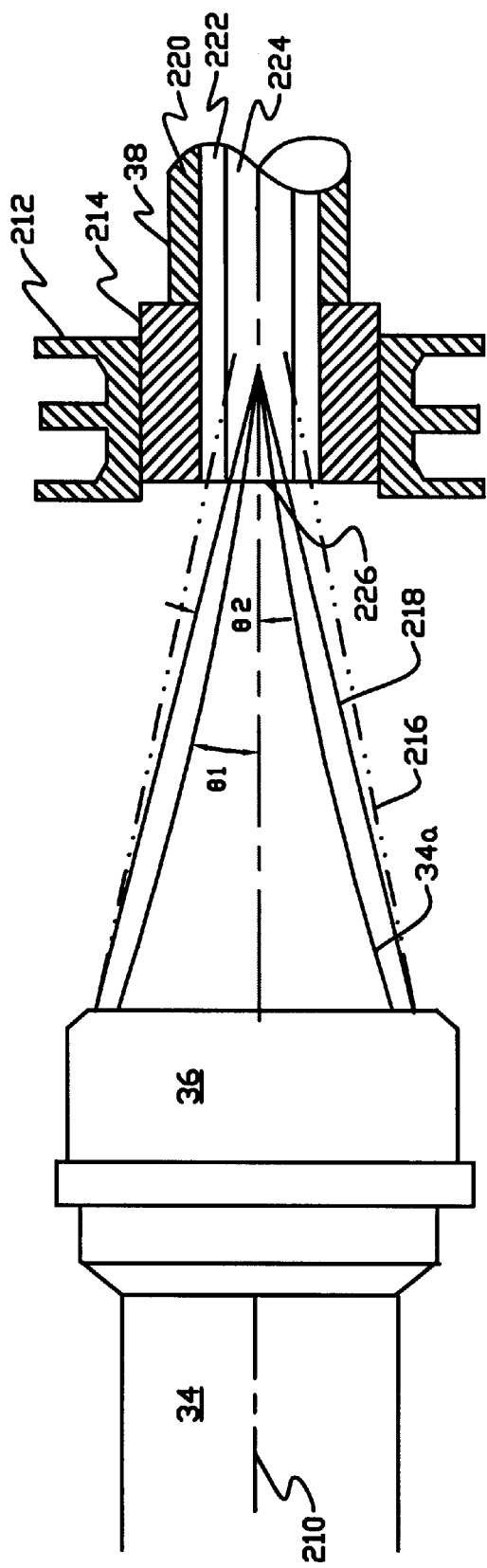
FIG. 5 is a side view of a subsystem for inserting the input beam of FIG. 3 into an optic fiber waveguide for transfer over distance in accordance with the invention.

FIG. 5 shows the insertion of laser input beam 34 into laser energy fiber optic 38 which includes a core 224, cladding 222, and jacket 220. An input beam 34, with center line 210, enters lens assembly 36 from the left. The lens assembly 36 collimates and focuses input beam 34 into input laser beam 34a. The working input laser beam 34a cross section is defined by angle θ1 from center line 210. Angle θ1 is chosen to be smaller than the cross section of core 224 of first face 226 of fiber optic 38. Angle θ2 defines a cross section which includes the working input laser beam 34a and light spillage which could damage the cladding of fiber optic 38. Thus radiation within a radius of angle θ2 should impinge on the core 224 of first face 226. The approximate limit of beam spillage 216 may extend out to the cladding 222. The described alignment avoids damaging the face of the fiber optic 38. Additional precautions include protecting jacket 220 by ferrule 214 and dissipating heat by sink 212.

Figure 6A:
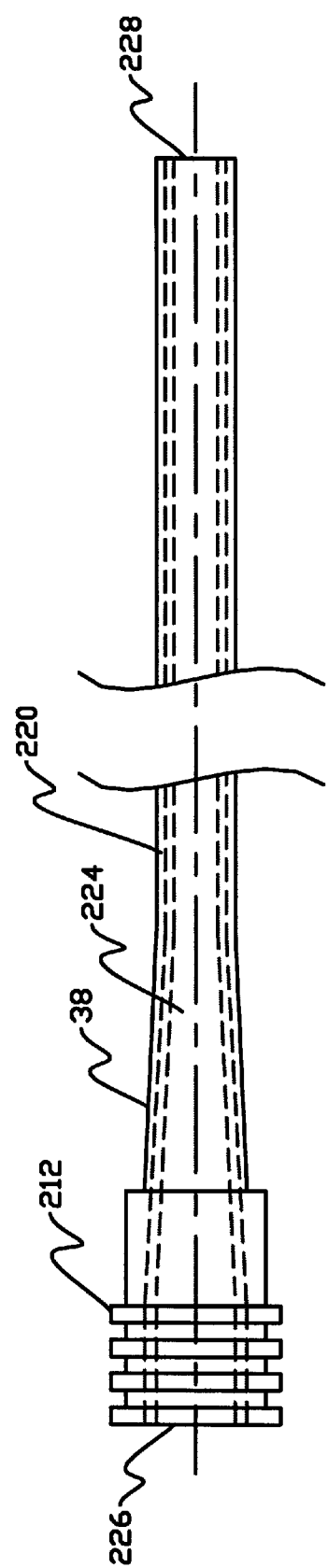
FIG. 6a and FIG. 6b are side views of fibers for transferring the input beam of FIG. 3 over a distance in accordance with respective embodiments of the invention.
Figure 6B:
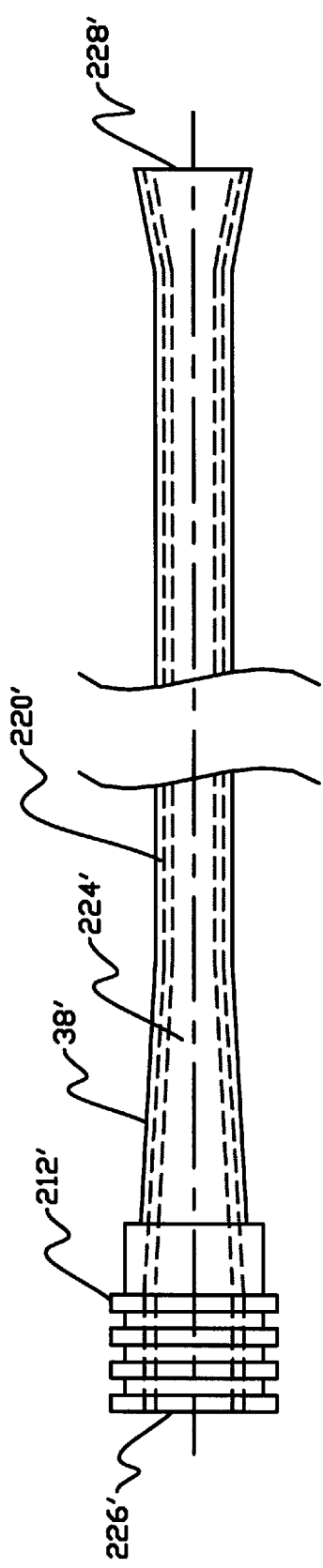

As mentioned above, radiation slams into face 226 with some of it re-radiating as non-usable heat. A fiber optic body of a given diameter could carry about 10 times the amount of laser radiation that can be inserted past a face of the same diameter. A solution, shown in FIG. 6a, is to have a face with ten times (slightly more than three times the radius) the cross section area of the body of the fiber. For example, a fiber with a body about 50 $\mu$meters in radius should have a face about 150 $\mu$meters in radius to be efficient. The fiber optic 38 must taper from the face 226 to its body in order to accommodate the differing radii. The length of the input taper from face 226 to the body of the fiber may as long as 2 to 2.5 meters. In cases of particularly energetic lasers, an output taper, shown in FIG. 6b, may also be necessary. The length of the output taper may be made considerably shorter than the input taper. Depending upon the power of the laser used, the output taper from the body of the fiber to output face 228' may be only a few tens of centimeters long.

Figure 7:
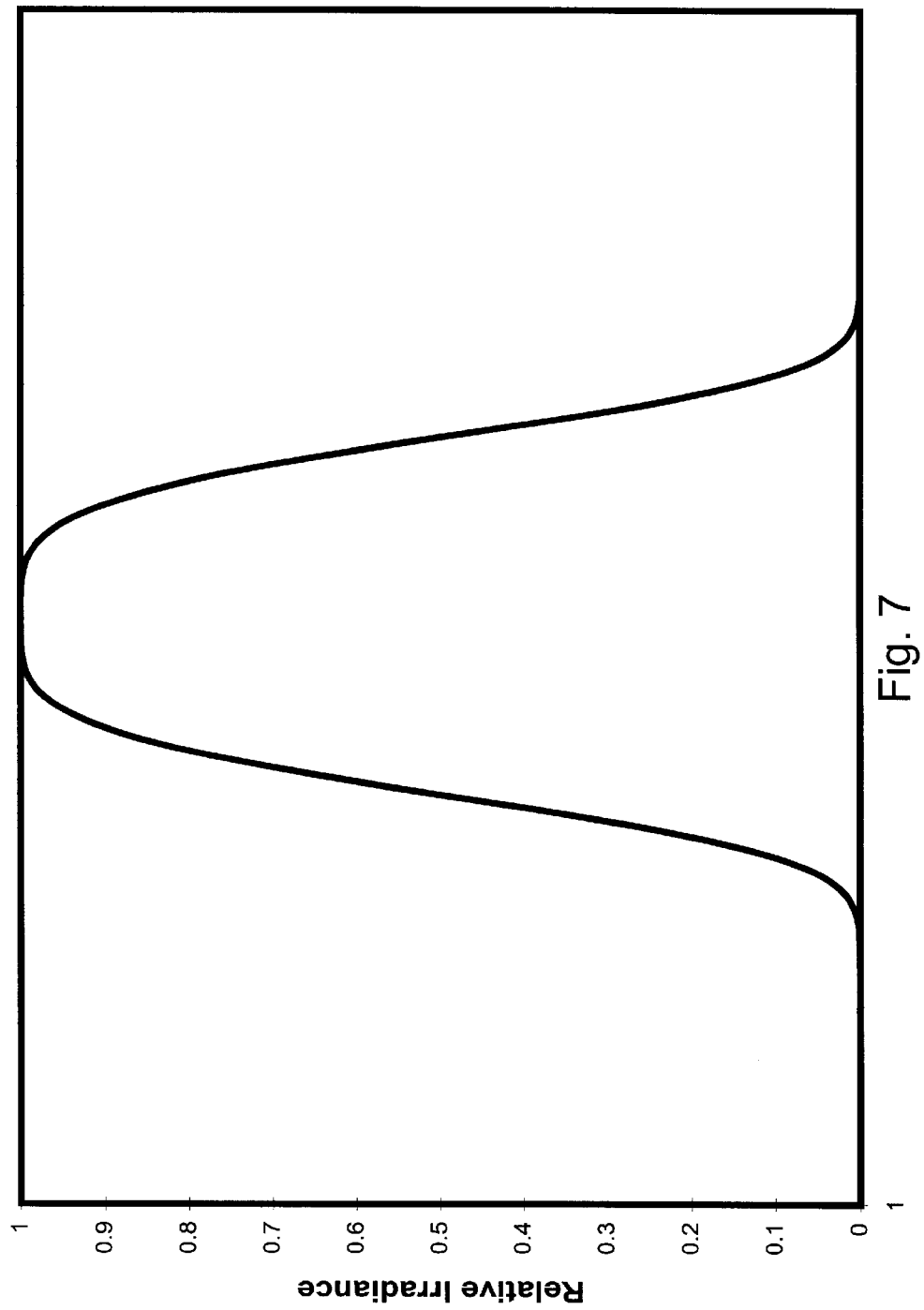
FIG. 7 is a intensity profile for the input beam of FIG. 3 after fiber transfer over a distance ("output beam") in accordance with the invention.
Figure 8:
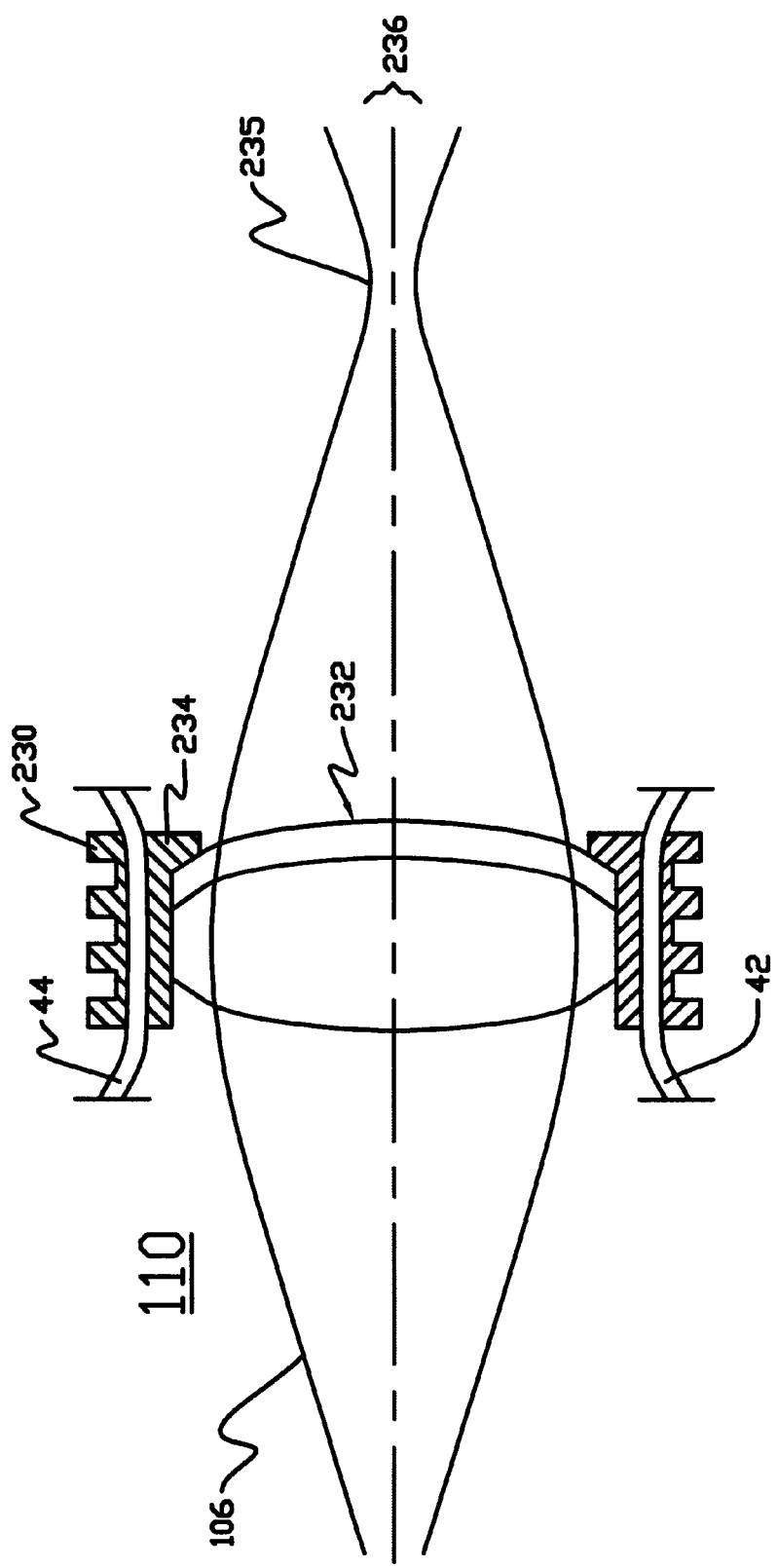
FIG. 8 is a side view of an objective in accordance with the invention, incorporating a heat dissipation system, for focusing the output beam of FIG. 7.

Upon exiting second face 228 of fiber 38, output beam 106 has an beam intensity profile resembling a mesa (or "top hat") function shown in FIG. 7. Output beam 106 will begin to diverge upon exiting fiber optic 38, as shown in FIG. 8. Objective lens system 110 in the work head 100 re-collimates and re-focuses beam 106 at a doublet lens 232 (or equivalent) so that beam 106 converges to waist 235 having width 236. Some radiation from output beam 106, upon impinging upon doublet lens 232, will be converted into unuseable heat. To protect lens system 106 from heat damage a heat sink 230 and/or coolant circulating through tubes 42 and 44 may be attached to lens mount 234.

Figure 9:
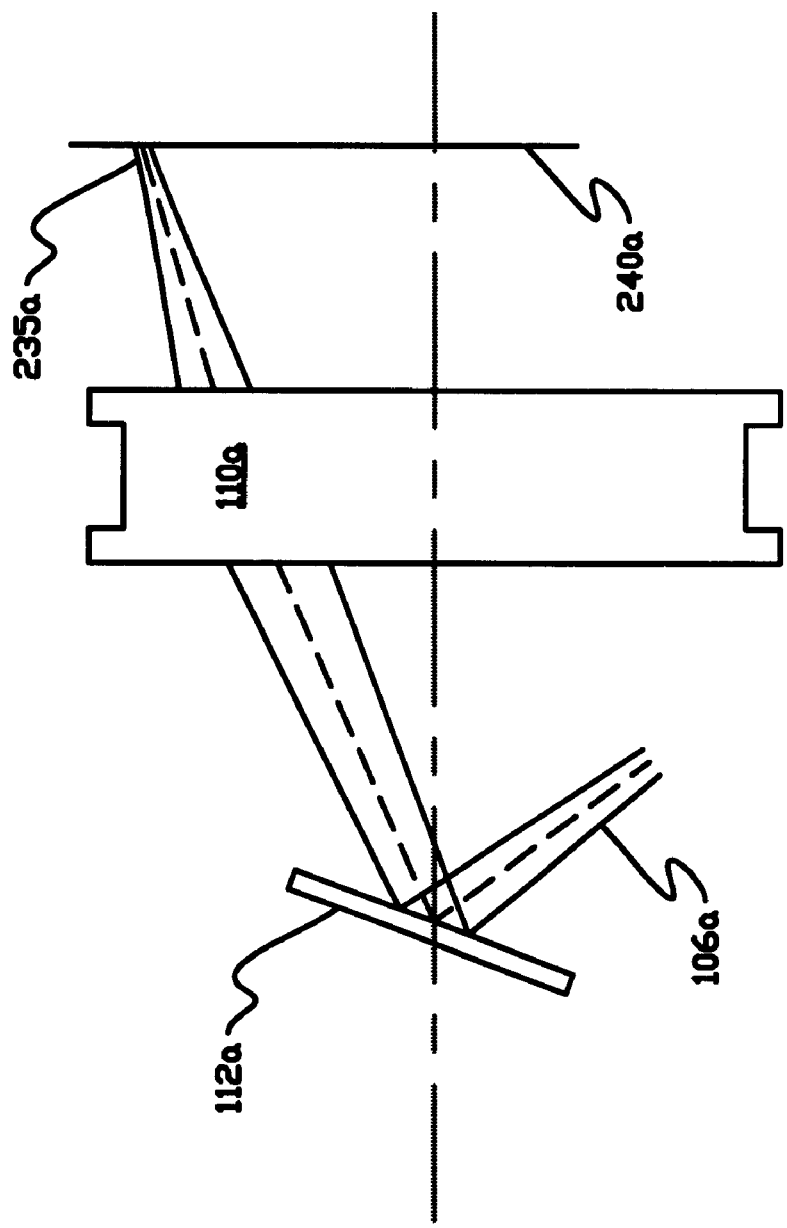
FIG. 9 is a side view of a pre-objective scanning system for scanning and then focusing the output beam of FIG. 7 in accordance with an embodiment of the invention.
Figure 10:
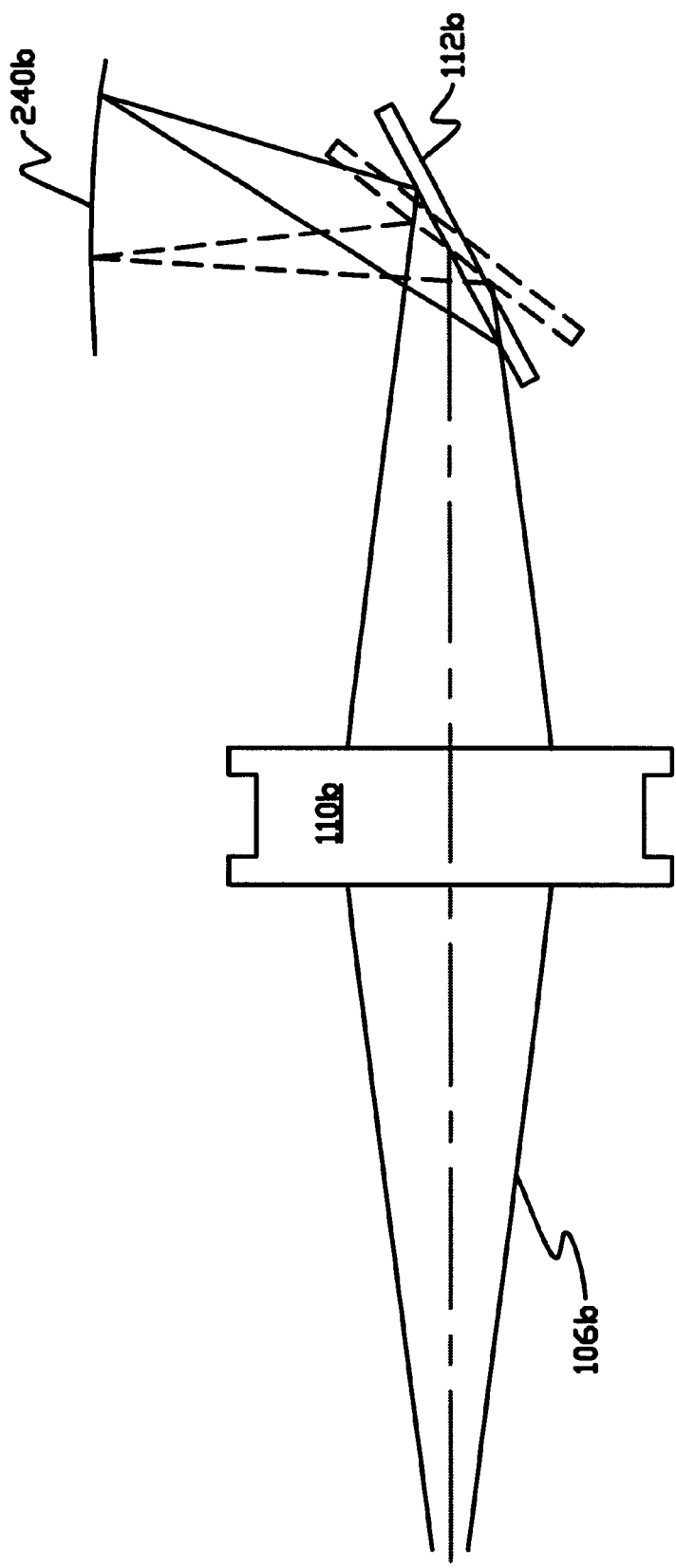
FIG. 10 is a side view of a post-objective scanning system for focusing and then scanning the output beam of FIG. 7 in accordance with an embodiment of the invention.

FIG. 9 shows the effect of a pre-scanning system on focal plane 240a. Beam 106a is scanned at mirror 112a prior to impinging upon objective 110a. The advantage is of having a well defined focal plane 240a of minimal depth, although at a higher cost than the post-scanning system in FIG. 10. In contrast, the post-scanning system of FIG. 10 shows beam 106b entering objective 110b before being scanned at mirror 112b. The result is a curved focal plane 240b of some depth. However, except for some fine or exacting work (e.g. restoration of art work), the embodiment of FIG. 10 for post-scanning beam 106 after exiting work head 100 objective lens system 110 will provide a focal plane accurate enough to justify the cost savings.

LAS control systems must scan pulsed beam 106 so that individual pulses overlap providing uniform treatment across a work surface. Given an individual pulse profile shown in FIG. 7, multiple pulse profiles in a given row (x-axis), should be scanned to overlap as shown in FIG. 11. An initial pulse 250a is sent to the work surface contaminate 162. A second pulse 250b is timed and scanned to overlap about two-thirds up the profile height of pulse 250a to minimize spots of over treatment ("hot spots") and spots of under treatment ("umbras"). The overlap region 252 is termed "penumbra" in this application.

FIG. 12 is a face-on view of the pattern of pulses of beam 106 in both the x-axis direction and the y-axis direction in a scanning embodiment of this invention. As also shown in FIG. 11, pulse 250a overlaps 250b. Penumbra 256 indicates the preferred area of overlap. Umbra 254 indicates a spot on the edge of under treatment. After beam 106 has been scanned down the row, or x-axis, to the location of pulse 250n, it may be scanned up a column ("y-axis"). When a beam is scanned in the y-axis it is preferred to also offset the position slightly in the x-axis, as shown by comparing the location of pulse 250n with pulse 258. The amount of offset, using the center points of groups of three of the pulses as a reference, should be 60 degrees.

Figure 13:
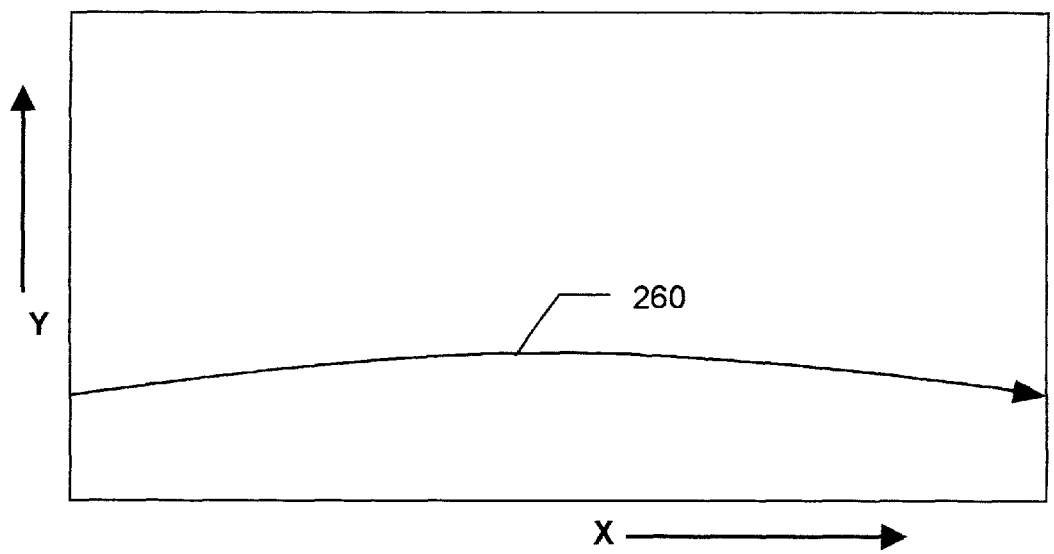
FIG. 13 is a plan view of a scan path of the repeated output beam of FIG. 7 impinging upon a work surface in accordance with the invention.
Figure 14:
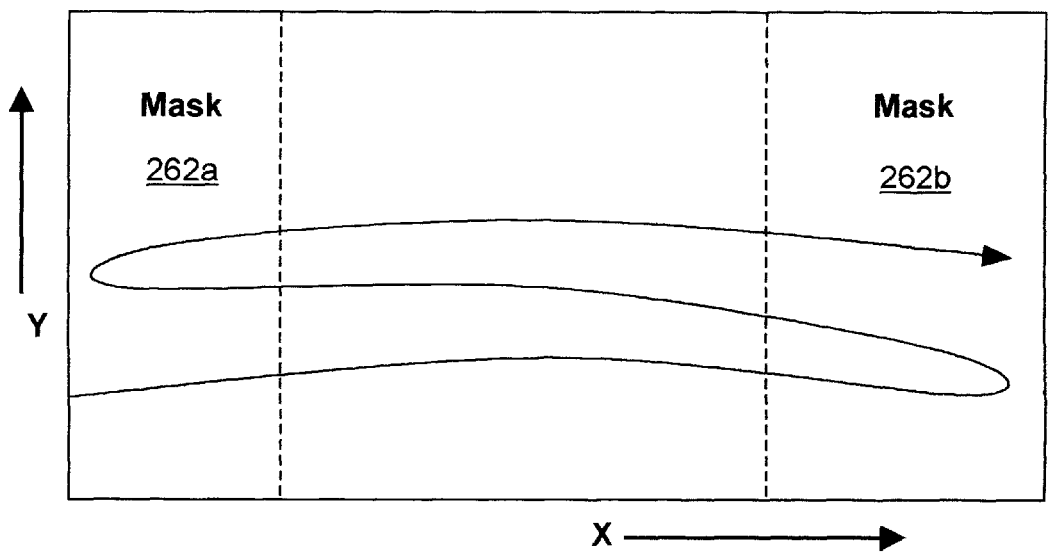
FIG. 14 is a plan view of a sequence of scan paths, with masking, of the repeated output beam of FIG. 7 impinging upon a work surface in accordance with the invention.

As the pattern of pulses reaches the edge of the work area under treatment, a row 260 may curve (FIG. 13). As the beam 106 is scanned in the y-axis direction, umbras may become numerous. A solution, shown in FIG. 14 is to apply masks 262a and 262b over the edges so that the central portion is more evenly treated.

Figure 15:
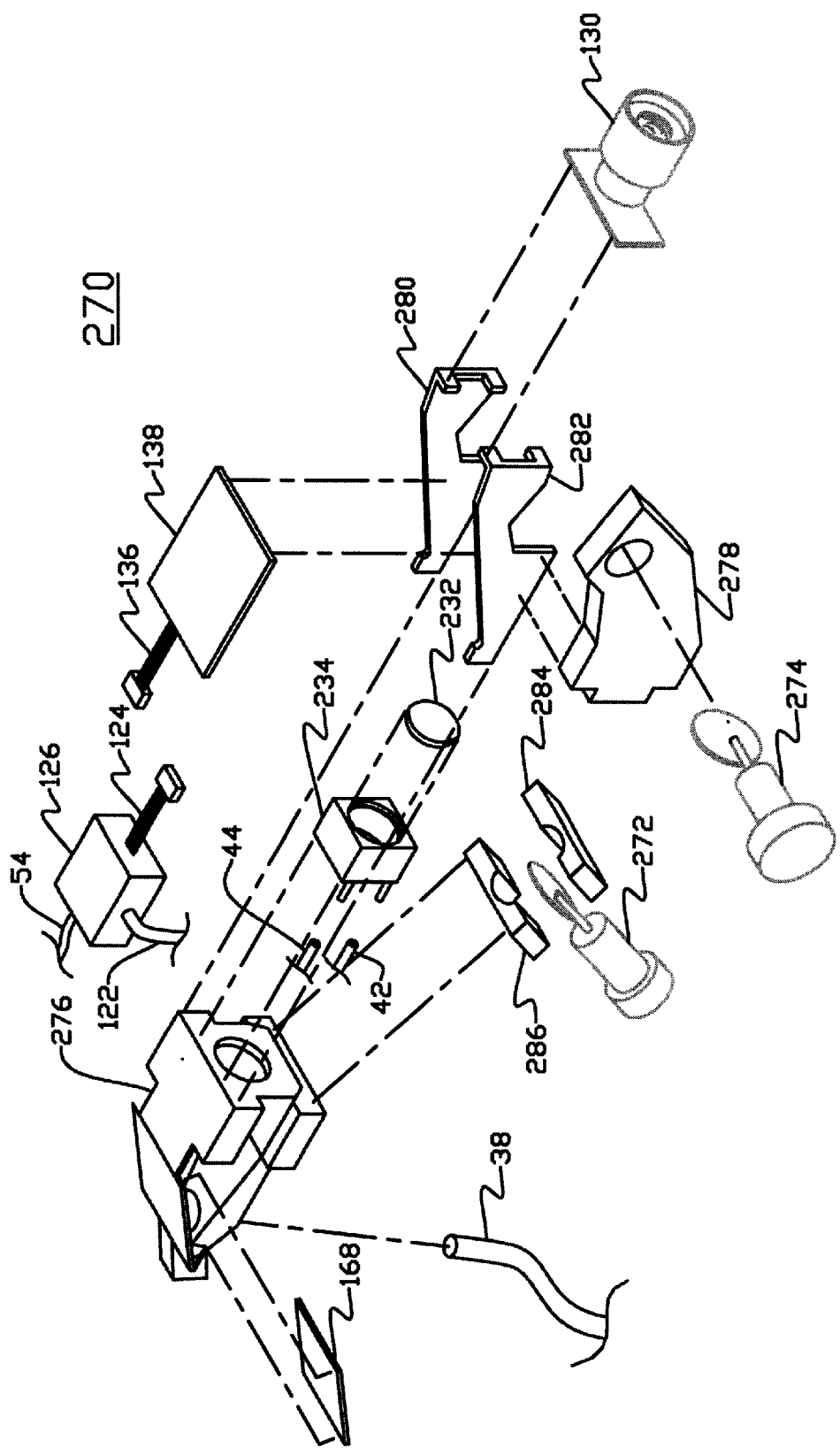
FIG. 15 is an exploded isometric view of a chassis and subsystems associated with the chassis in accordance with an embodiment of the invention incorporating the post-objective scanning system of FIG. 10.
Figure 16:
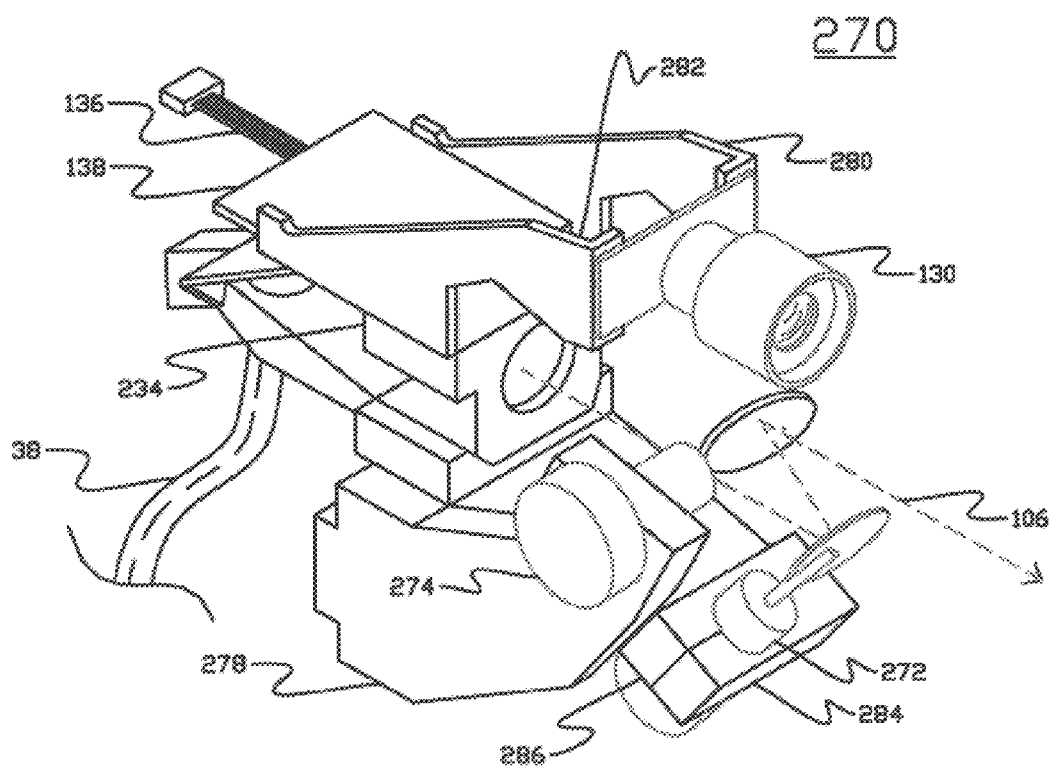
FIG. 16 is an isometric view of an assembly of the chassis and subsystems of FIG. 15.

FIG. 15 and FIG. 16 show how a work head subsystem may be assembled as a chassis 270. While many of the components of FIG. 15 and FIG. 16 were described above, the figures show how they may be arranged in a working system. The fiber optic 38 emits radiation at mirror 168 mounted on optics frame 276. In addition, lens mount 234 and mounts 284 and 286 for x-axis scanner 272 attach to optics frame 276. Mount 278 for y-axis scanner 274 attaches to camera mount 282 which in turn cooperates with camera mount 280 to hold camera 130 along with control circuitry 138 to the remainder of chassis 270.

Figure 17:
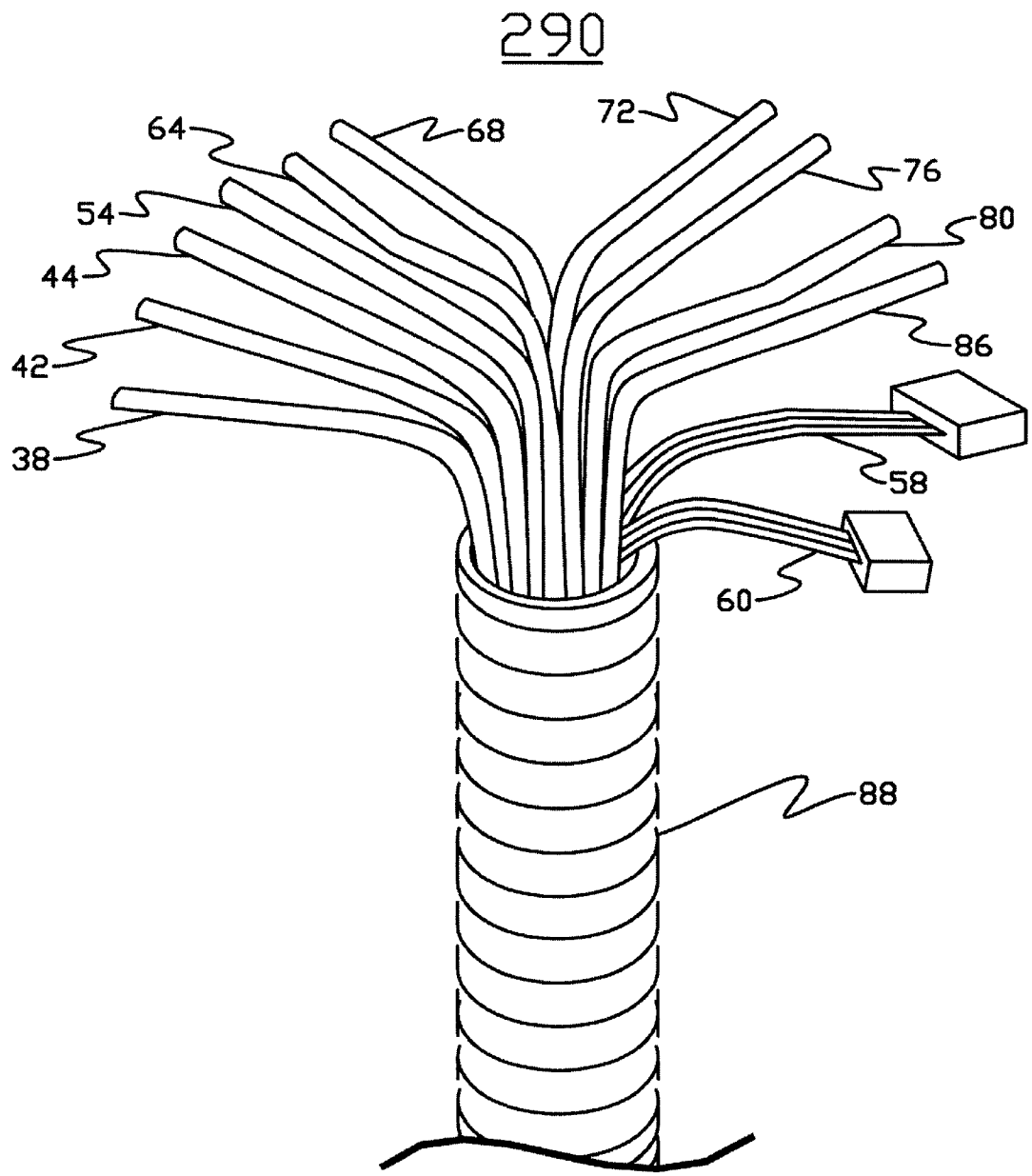
FIG. 17 is an isometric view of an umbilical tube and associated transport, transfer, and communications conduits in accordance with the invention.

Conduits encased within umbilical tube 88 (FIG. 17 showing umbilical tube assembly 290) include: fiber optic 38, coolant transport tube to work head 42, coolant transport tube from work head 44, monitor cable from work head 54, illumination fiber optic 64, strain relief 68, transport tube for pressurized air 72, transport tube for inert gas 76, electrical power cable to work head 80, exhaust tube 86, and cables 58 and 60 for control and monitoring of workhead 100.

Figure 18:
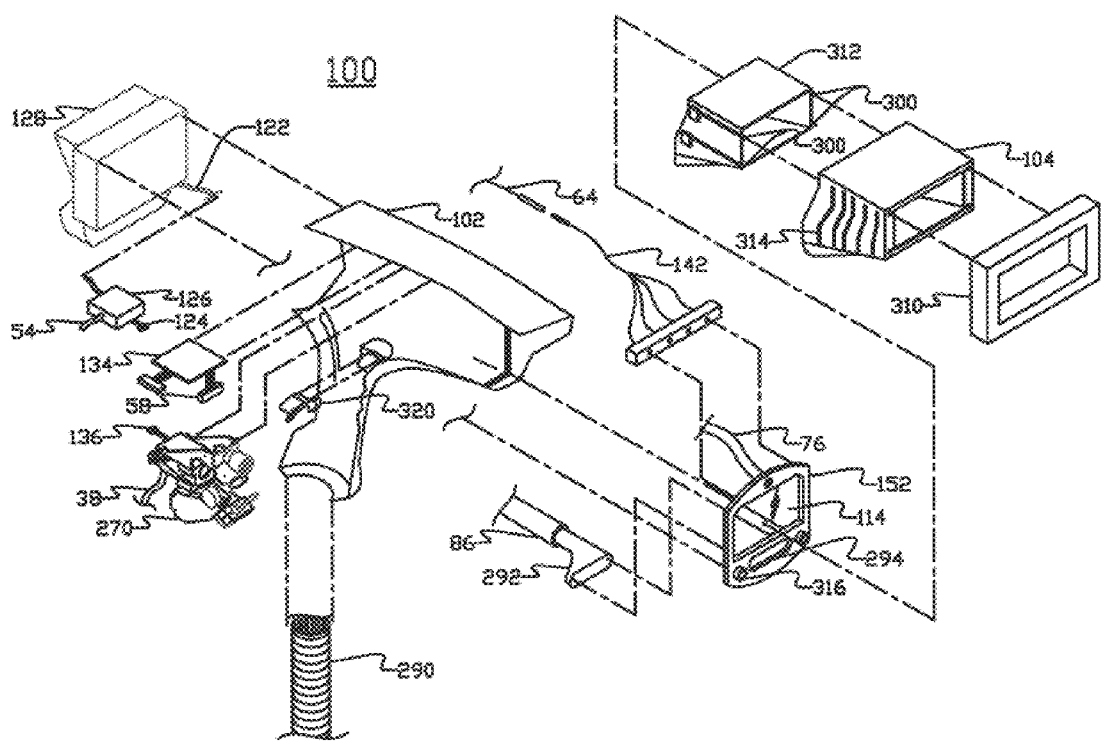
FIG. 18 is an exploded isometric view of a work head interior in accordance with the invention.

FIG. 18 shows how subsystems in work head 100 may be assembled. Components including monitor 128, switch 126, safety circuitry 134, chassis 270, window 114 and seal 152 assembly, and nozzle 104 assembly may be connected directly to the shell 102. Window 114 and seal 152 assembly carry illumination distribution system 142, exhaust tube 86, exhaust tube nozzle 292, and exhaust tube inlet 294, as well as inductive signal connector 316 for passing information between work head controller and safety interlock points 300. Nozzle 104 attached to one end of shell 102 includes nozzle seal 310 and nozzle insert 312 which in turn carries safety interlock points 300. Air inlets 314 along with baffles (not shown) provide air for exhaust suction. An operator trigger 320 may be mounted on the underside of the shell 102.

FIG. 19 is an exterior view of the work head 100 showing the shell 102 exterior, monitor 128, umbilical tube assembly 290, nozzle 104, and an emergency shut down switch 330.

Figure 20:
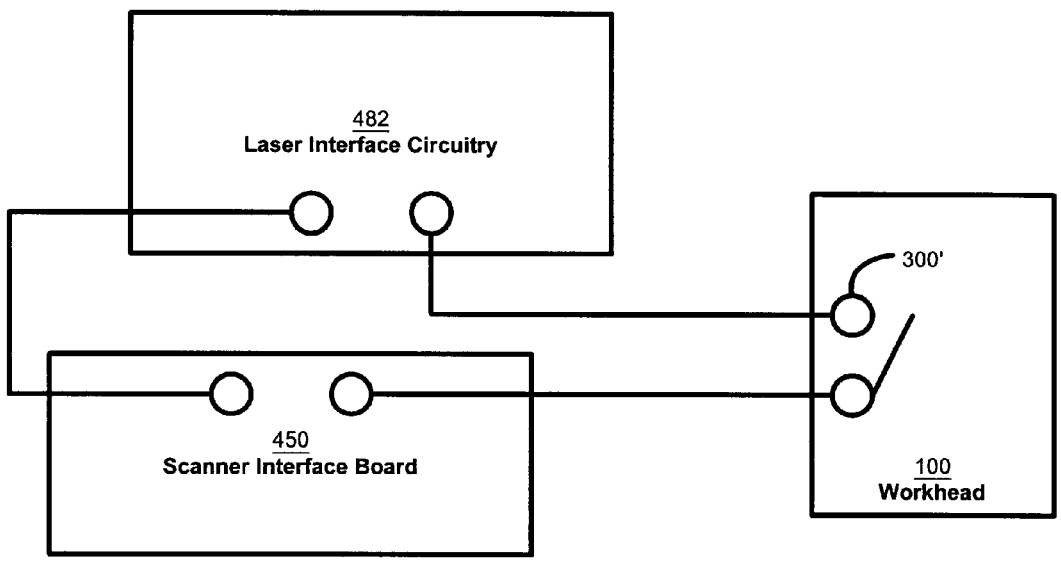
FIG. 20 is a schematic of a safety interlock circuit for laser operation in accordance with the invention.
Figure 21:
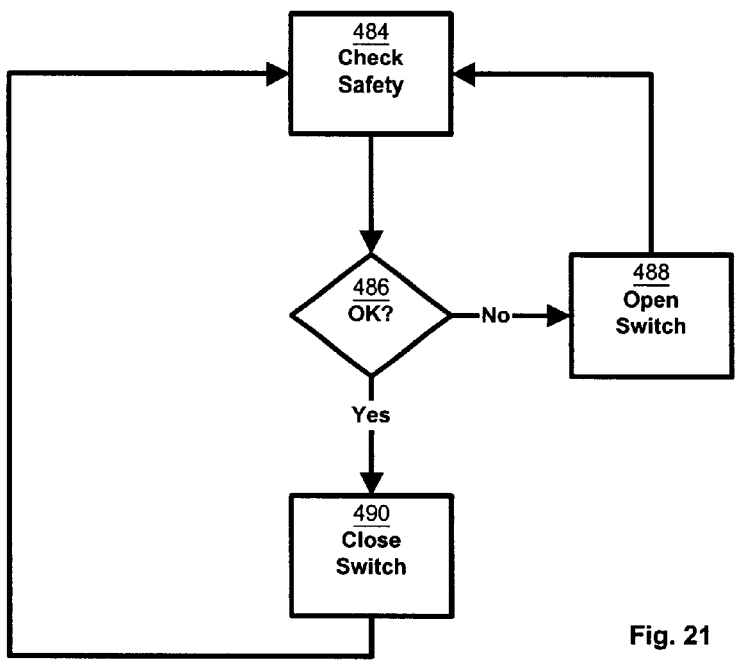
FIG. 21 is a flow chart of the operation of the circuit of FIG. 20.

FIG. 20 and FIG. 21 show a safety interlock circuit and its operation within this invention. Scanner interface board 450 is connected to both work head 100 and laser interface circuitry 482. When safety interlock pointers 300 are simultaneously engaged on work surface 164, switch 300' closes; scanner interface board 450 detects closed switch 300' and enables laser interface circuitry to be ready to send a laser pulse beam 34. The sequence is first to check safety 484. If points 300 are not simultaneously engaged, open 488, and maintain as open, switch 300'. If points 300 are simultaneously engaged, close 490 switch 300' and continuously check that points 300 remain in contact with work surface 164.

Figure 22:
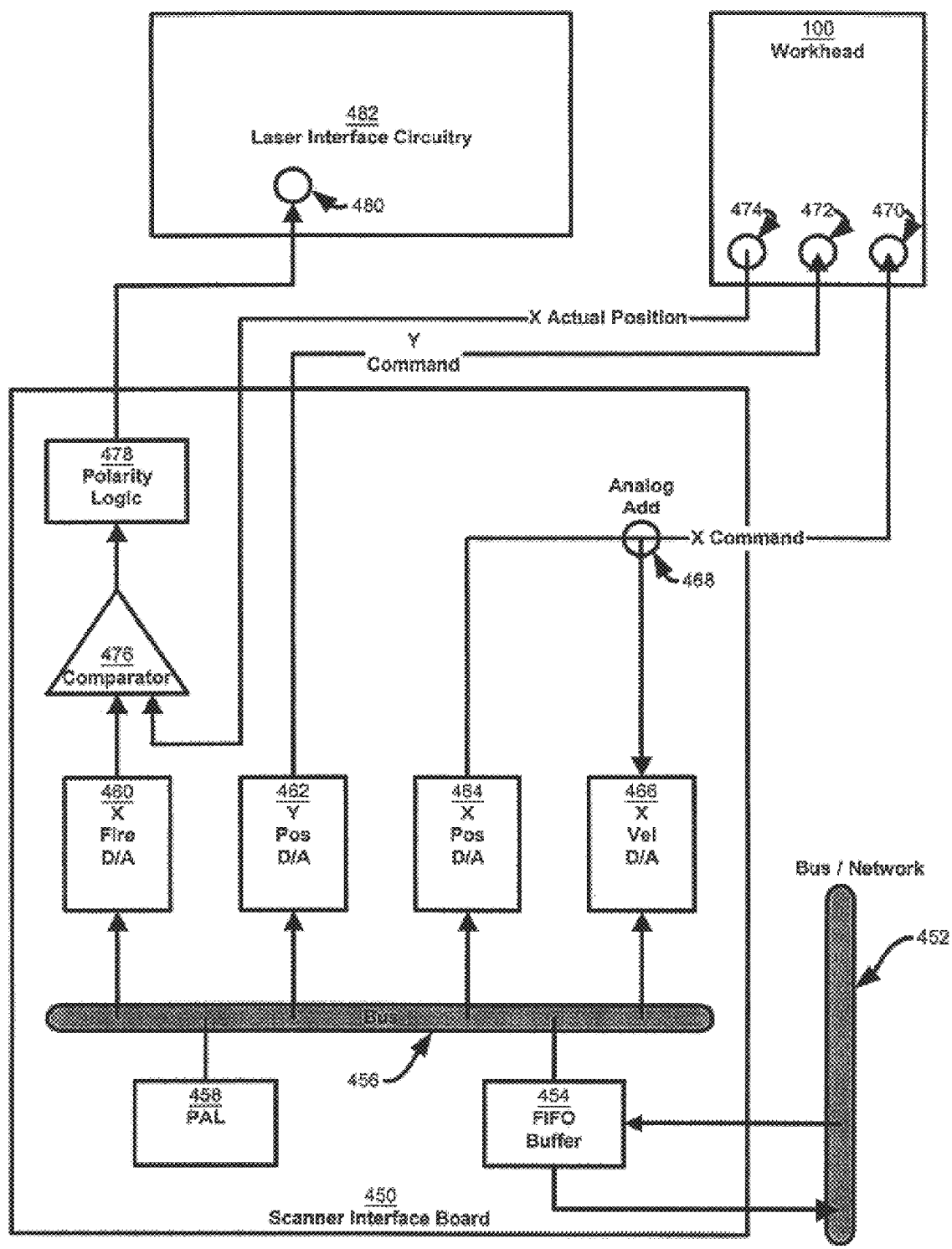
FIG. 22 is a schematic of circuitry for controlling a laser and scanning the output beam of FIG. 4.
Figure 23:
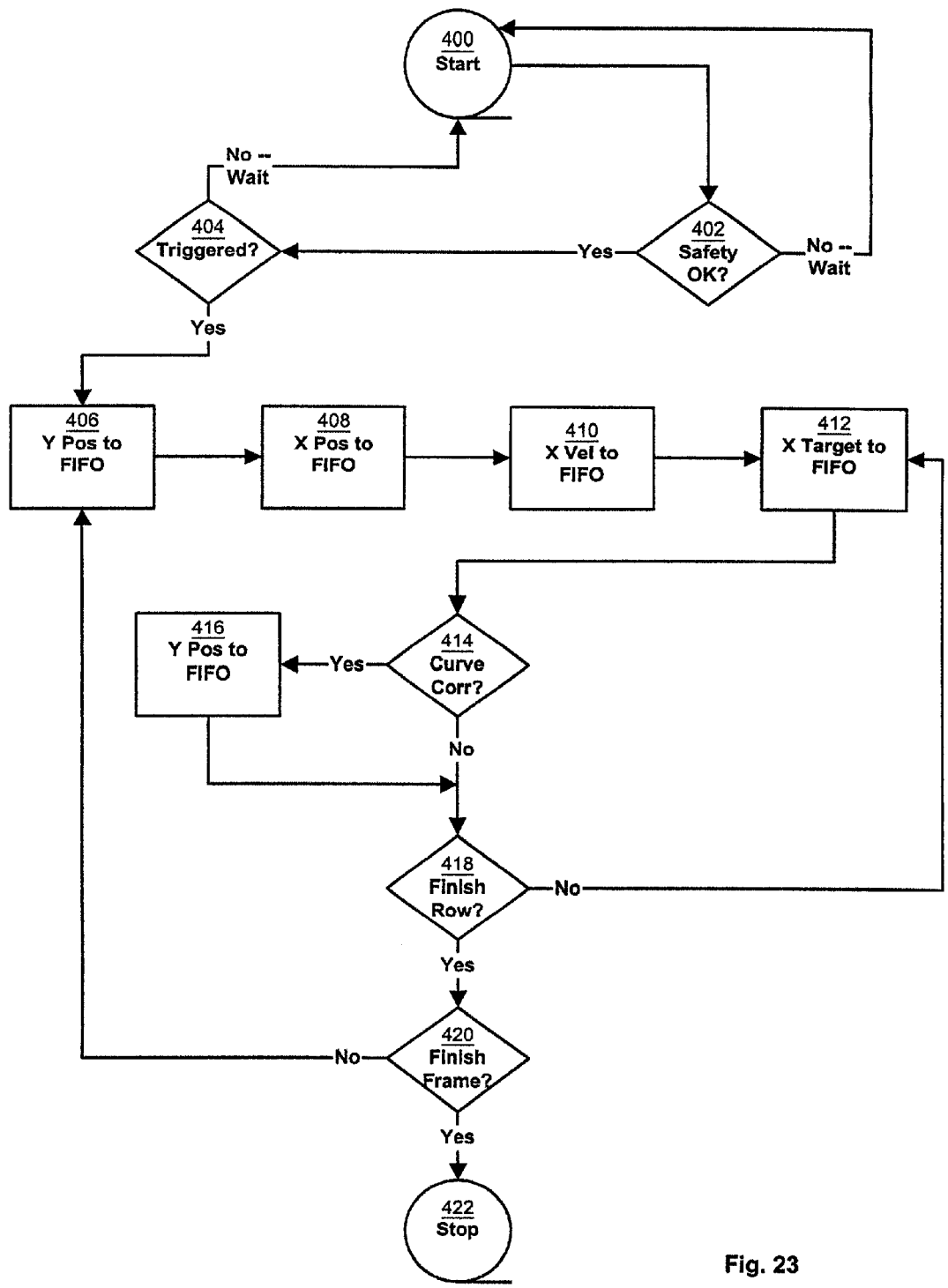
FIG. 23 is a flow chart of the operation of the circuitry of FIG. 22.

Referring now generally to the figures and particularly FIG. 22 and FIG. 23, a flow chart describes the decision process of the system controller 48 of FIG. 1a. A start node 400 transfers program control to a safety state query node 402 where a positive safety condition must be sensed in order for program control to transfer to a trigger state query node 404. If a positive safety condition is not sensed at the safety state query node 402, program control reverts to the start node 400.

The trigger state query node 404 reacts to the instantaneous physical position of a trigger 320 of the work head 100. Program control is transferred from the trigger state query node 404 back to the start node 400 when the trigger 320 is determined to not be sufficiently pulled into an enablement range of a full motion range of the trigger 320. Program control is transferred from the trigger state query node 404 to a Y Pos to FIFO node 406 when the trigger is sensed to be within the trigger enablement range. Program control next advances from the Y Pos to FIFO node 406, after a writing of a Y position coordinate into a FIFO 454, to an X Pos to FIFO node 408 intensity. An X position coordinate is then written into the FIFO 454. Program control then proceeds onto a X Vel to FIFO node 410, where an X velocity value is written into the FIFO 454. Program control next immediately proceeds onto an X Target to FIFO node 412 where an additional X target value is written into the FIFO 454. Program control then advances onto a curve correction query node 414. If a positive state is detected at the curve correction node 414, a Y position coordinate value is next communicated into the FIFO 454 at a Y Pos FIFO node 416 and program control proceeds then onto a finish row node 418. If a negative curve correction condition is initially seen at the curve correction query node 414, program controls steps directly from the curve correction node query 412 to the finish row query node 418.

A negative state sensed at the Finish Row query node 418 causes the program control to revert to the X Target to FIFO node 412, which will cause the program control to pass again through the steps of transferring an X target value to the FIFO and moving program control to the curve correction query node 414. The detection of a positive state by the finish row query node 418 directs program control to a Finish Frame query node 420. A negative indication at the Finish Frame query node 420 drives program control to the Y Pos to FIFO node 406. A positive reading at the Finish Frame query node 420 moves program control into a stop node 422, wherein a set of ablating laser pulses is determined to have been fired.

Referring now to the figures, and particularly FIG. 22 and 23, scanner interface board 450 is linked to the system controller 48 via a bus/network 452, wherein surface treatment control and coordinate digital data signals are transferred from the system controller 48 onto a FIFO buffer 454. The FIFO buffer 454, initially stores and then retransmits the data received from the bus/network 450 to the scanner interface bus 456 in first in first out order. The Programmable Logic Array 458, or PAL, controls the bi-directional communication of data over the scanner interface bus 456. The scanner interface bus 456, under the control of the PAL 458 thereby programmatically transmits data presented by the FIFO buffer 458 to the X fire digital/analog converter 460, or X fire D/A, a Y position digital/analog converter 462, or Y pos D/A, an X position digital/analog converter 464, or X pos D/A, and an X velocity digital/analog converter 466, or X vel D/A. The analog outputs of the X pos D/A 464 and the X vel D/A 466 are added on the analog add node 468, wherefrom the resultant sum is transmitted to an X position input 470 of the work head 100. The analog output of the Y pos D/A is directly communicated as an analog signal level to a Y position input 472 of the work head 100. A scanner position node 474 of the work head 100 communicates a position of the x scanner to a comparator 476. The comparator 476 receives the analog output of the X fire D/A 460 and thereby determines if and when the laser interface circuitry is to generate a input beam 34. The output of the comparator 476 is transmitted to a polarity logic circuit 478, and the output of the polarity logic circuit 478 is thereupon communicated to a laser initiation node 480 of a laser interface circuitry 482.

The scanner interface board 450 thereby directs the laser 32 and the scanner 112 to direct a series of pulses of the input beam 34 sequentially at work surface contaminate 162. The work surface contaminate is typically selected from groups of coordinates located along a particular Y axis coordinate and one or more X axis coordinates.

SUMMATION OF DETAILED DESCRIPTION

A system for treating surface material overlying a substrate, and more particularly, to a system for ablating contaminates and other unwanted material from a worksite using a pulsed laser beam. The system includes three main sub-systems: a back end (30), a work head (100), and an umbilical tube (88) to protect conduits communicating between the back end (30) and the work head (100). The back end (30) includes heavy and bulky equipment such as a laser (32), chiller, pressurized air source (70), suction system, waste containment system, and electric power source (78). A conveyance such as a trailer may enclose the back end (30) to make it transportable. The work head (100) includes lightweight equipment such as scanning mirrors, optics, and camera (130). During operation, the work head (100) is pressed against the surface material and the laser (32) activated. Then scanning mirrors within the work head (100) arrange pulses from the laser beam according to a selected raster and dither pattern and direct them to the surface material. Ablated detritus may be suctioned through a conduit through the work head (100) and thence to the waste containment system in the back end (30). Electric power, laser energy, control and monitor signals, air, and suction are transported between the back end (30) and the work head (100) through the conduits encased within the umbilical tube (88).

Although the description above contains many specificities, these should not be construed as limiting the scope of the invention but as merely providing illustrations of some of the presently preferred embodiments of this invention. Those skilled in the art will appreciate the various adaptations and modifications of the above described preferred embodiments which can be configured without departing from the scope and spirit of the invention. Therefore, it is understood that, within the scope of the appended claims and their legal equivalents, the invention may be practiced other than as specifically described herein.

We claim:

1. An apparatus for treating surface material on a substrate comprising:
    a back end system comprising:
        a source of pressurized gas feeding into a first conduit, the first conduit extending from the back end to the work head;
        means for suctioning waste material through a second conduit, the second conduit extending from the back end to the work head;

means for filtering waste material from the means for suctioning;

means for supplying electric power to the back end;

means for supplying electric power to a work head through a third conduit, the third conduit extending from the back end to the work head;

a laser capable of emitting a pulsed beam of coherent electromagnetic radiation; a chiller for refrigerating a coolant;

means for circulating the coolant about the laser;

means for circulating the coolant to a work head through a fourth conduit, the fourth conduit extending from the back end to the work head;

means for monitoring the operation of the work head, the means for monitoring communicating with the work head through a fifth conduit, the fifth conduit extending from the back end to the work head;

control means for directing the operation of the work head, the control means communicating with the work head through a sixth conduit, the sixth conduit extending from the back end to the work head;

a light source capable of generating a beam of visible light, the visible light transported from the back end to the work head through a seventh conduit, the seventh conduit extending from the back end to the work head;

one or more lenses positioned to collimate and to focus the pulsed beam;

an optic fiber, capable of transporting the pulsed beam, positioned to accept the pulsed beam at a first face after the pulsed beam is collimated and focused;

the optic fiber, further having a core, a cladding, a body, and a second face, the body extending from the back end to the work head; and the core having a diameter at the first face sufficiently large to accept the pulsed beam;

a flexible umbilical cord, connecting the back end with the work head, surrounding the body of the optic fiber, surrounding the first, second, third, fourth, fifth, sixth, and seventh conduits, and comprising means for providing strain relief;

the work head comprising:
  a shell with an interior and an exterior wherein the interior contains:
    the second face of the optic fiber positioned to deliver the pulsed beam to optic elements;
    the optic elements arranged to re-collimate and re-focus the pulsed beam so that the surface material is substantially in the focal plane of the re-collimated and re-focused pulsed beam;
    a scanner to scan the re-collimated and re-focused pulsed beam relative to the surface material wherein the scanned pulsed beam is directed to a window positioned between the shell and the surface material, the window transparent to the scanned pulsed beam;
    a seal surrounding the window and obstructing detritus from the surface material from entering the shell interior;
    the seventh conduit directing the beam of visible light through the window so that the surface material is illuminated;
    a camera pointing essentially perpendicular at the window so that the camera monitors illuminated surface material;
    signals from the camera directed to one or more monitors in the work head and the back end, the signals communicated to the back end through the fifth conduit;
    a control system coordinating work head systems;
    a control system feeding operation information to the back end through the sixth conduit and to an operator of the work head;
    the second conduit transporting suctioning through the seal;
    a first conduit transporting the gas passes from the umbilical cord into the shell interior and through the seal;
    an eighth conduit extending from the work head control system through the seal, the eighth conduit communicating interlock signals;
    a tap in the first conduit creating gas pressure within the shell interior greater than ambient air pressure on the outside of the shell;
  a nozzle attached to the exterior of the shell, and surrounding the seal and the window, wherein the nozzle includes flexible material along the perimeter of the nozzle to surround and to contact the surface material;
    the nozzle further including safety interlock points, an air knife, and a waste hose wherein:
    the safety interlock points pass interlock signals through the eighth conduit extending into the work head;
    the air knife obtains pressurized gas from the first conduit extending through the work head;
    the waste hose passes waste from the surface material to the second conduit; and
  the exterior of the shell including means for the operator to monitor and control the operation of the work head.

2. An apparatus for transporting the apparatus of claim 1 comprising:

a conveyance containing the back end system;

means for connecting the umbilical cord to the back end system and the work head; and means for stowing the work head within the conveyance.

* * * * *